US012632166B1

(12) United States Patent
Vespe

(10) Patent No.: US 12,632,166 B1
(45) Date of Patent: May 19, 2026

(54) INTERACTIVE MULTIMEDIA ARCHITECTURES

(71) Applicant: Where Is It At, Norristown, PA (US)

(72) Inventor: Brad Vespe, Norristown, PA (US)

(73) Assignee: Where Is It At, Norristown, PA (US)

(*) Notice: Subject to any disclaimer, the term of this patent is extended or adjusted under 35 U.S.C. 154(b) by 0 days.

(21) Appl. No.: 19/332,420

(22) Filed: Sep. 18, 2025

Related U.S. Application Data

(60) Provisional application No. 63/861,019, filed on Aug. 10, 2025, provisional application No. 63/858,503, filed on Aug. 6, 2025, provisional application No. 63/857,109, filed on Aug. 4, 2025, provisional application No. 63/849,275, filed on Jul. 23, 2025, provisional application No. 63/841,775, filed on Jul. 10, 2025, provisional application No. 63/839,825, filed on Jul. 7, 2025, provisional application No. 63/839,221, filed on Jul. 6, 2025.

(51) Int. Cl.
| | |
|---|---|
| *G06F 3/04847* | (2022.01) |
| *G06Q 30/0241* | (2023.01) |
| *H04N 21/83* | (2011.01) |
| *G06F 3/01* | (2006.01) |

(52) U.S. Cl.
CPC ..... *G06F 3/04847* (2013.01); *G06Q 30/0277* (2013.01); *H04N 21/83* (2013.01)

(58) Field of Classification Search
None
See application file for complete search history.

(56) References Cited

U.S. PATENT DOCUMENTS

| | | | | |
|---|---|---|---|---|
| 8,732,271 | B1 * | 5/2014 | Burns | G06Q 30/0277 |
| | | | | 709/217 |
| 10,025,478 | B2 * | 7/2018 | Mulcahy | G06F 3/048 |
| 10,733,638 | B1 * | 8/2020 | Jain | G06Q 10/40 |
| 11,805,292 | B2 * | 10/2023 | Wang | H04N 21/4312 |
| 2012/0284105 | A1 * | 11/2012 | Li | G06Q 30/02 |
| | | | | 705/14.23 |
| 2016/0350822 | A1 * | 12/2016 | Ganesan | H04L 51/046 |
| 2017/0017634 | A1 * | 1/2017 | Levine | H04L 67/53 |
| 2017/0147906 | A1 * | 5/2017 | Shekhar | G06V 20/62 |
| 2021/0132691 | A1 * | 5/2021 | Ahuja | G06Q 30/02 |
| 2022/0188350 | A1 * | 6/2022 | Henderson | G06F 16/4387 |
| 2023/0262282 | A1 * | 8/2023 | Machida | H04N 21/4312 |
| | | | | 386/230 |
| 2024/0111474 | A1 * | 4/2024 | Fitzgerald | G06F 3/044 |

* cited by examiner

*Primary Examiner* — Toan H Vu
(74) *Attorney, Agent, or Firm* — Miller IP; Devin Miller

(57) ABSTRACT

Described herein are devices including a processor and a memory storing instructions that, when executed, determine contextual attributes of a viewer, including location, demographic data, behavioral patterns, device information, or time, and analyze digital content to identify contextual attributes of a business, service, or event through metadata parsing, object recognition, audio transcription, or machine-learning inference. The apparatus correlates the viewer's attributes with those of the content to generate a correlation score, produces an actionable control such as an order, reservation, deferred engagement, or directions option for display within a user interface, and, upon activation of the control, initiates a secure transaction with a third-party provide.

20 Claims, 15 Drawing Sheets

INTERACTIVE MULTIMEDIA ARCHITECTURES

CROSS-REFERENCE TO RELATED APPLICATIONS

The present application claims the benefit of U.S. Provisional Patent Application No. 63/839,221, entitled "Where Is It At? A system for determining and displaying the proximity and a location featured within social media content", filed on Jul. 6, 2025; Aug. 14, 2025; Aug. 19, 2025; Aug. 27, 2025; Aug. 31, 2025; Sep. 2, 2025; Sep. 7, 2025; and Sep. 8, 2025. The present application further claims the benefit of U.S. Provisional Patent Application No. 63/839,825, filed on Jul. 7, 2025, and Aug. 19, 2025; U.S. Provisional Patent Application No. 63/841,775, filed on Jul. 10, 2025; U.S. Provisional Patent Application No. 63/843,968, filed on Jul. 14, 2025; U.S. Provisional Patent Application No. 63/846,899, filed on Jul. 18, 2025; U.S. Provisional Patent Application No. 63/848,776, filed on Jul. 22, 2025; U.S. Provisional Patent Application No. 63/849,275, filed on Jul. 23, 2025; U.S. Provisional Patent Application No. 63/855,264, filed on Jul. 31, 2025; U.S. Provisional Patent Application No. 63/855,631, filed on Aug. 1, 2025; U.S. Provisional Patent Application No. 63/857,109, filed on Aug. 4, 2025; U.S. Provisional Patent Application No. 63/858,503, filed on Aug. 6, 2025; and U.S. Provisional Patent Application No. 63/861,019, filed on Aug. 10, 2025, and Aug. 12, 2025. The entire contents of each of the foregoing applications are hereby incorporated by reference for all purposes.

BACKGROUND

A digital media environment may deliver content to users across a range of connected devices and platforms. Such environments often involve audiovisual streams, social media feeds, or other forms of multimedia content presented in real time or on demand. Users within these environments may interact with content through actions such as viewing, liking, sharing, or commenting, and the nature of these interactions can vary depending on the device, the platform, and the context in which the content is consumed. The digital media environment may also incorporate mechanisms for associating supplementary information with content, including metadata, tags, or links to external resources.

BRIEF DESCRIPTION OF THE DRAWINGS

The present description will be understood more fully when viewed with the accompanying drawings of examples of interactive multimedia architectures. The description is not meant to limit the interactive multimedia architecture to the specific examples. Rather, the specific examples depicted and described are provided for explanation and understanding of interactive multimedia architectures. Throughout the description, the drawings may be referred to as drawings, figures, and/or FIGs.

DETAILED DESCRIPTION

Figure 1:
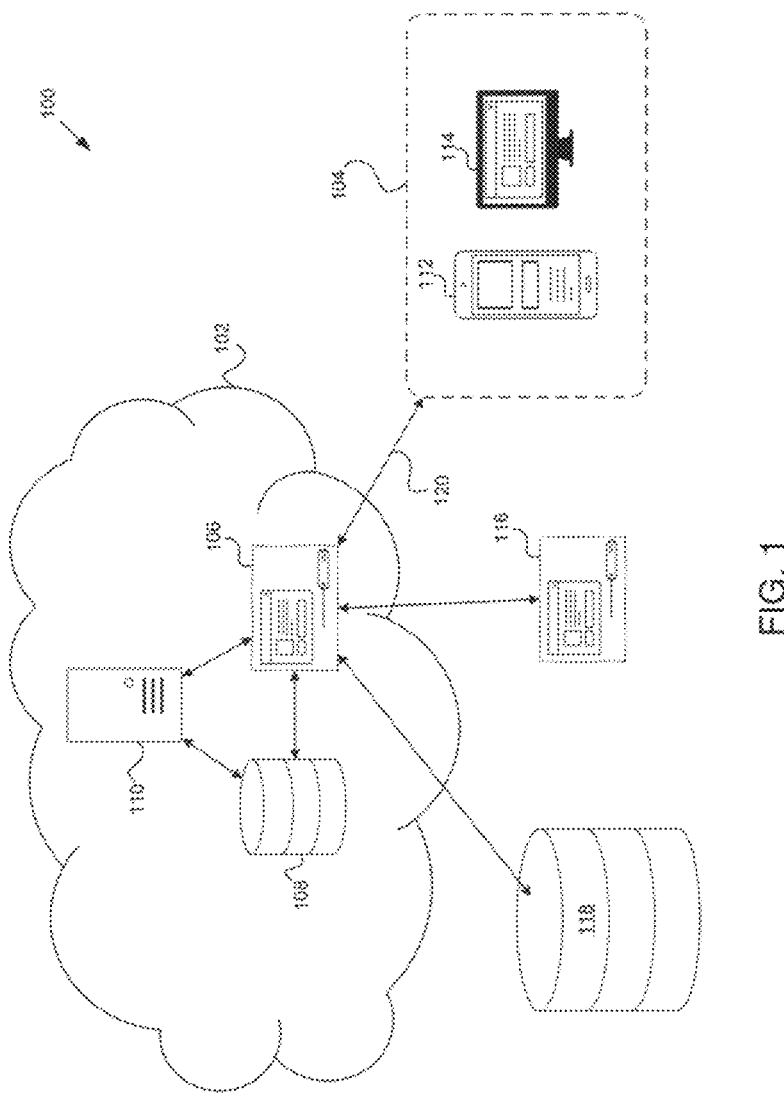
FIG. 1 illustrates an interactive multimedia engagement system, according to an embodiment.

An interactive multimedia engagement architecture as disclosed herein will become better understood by reviewing the following detailed description in conjunction with the figures. The detailed description and figures provide merely examples of the various embodiments of interactive multimedia engagement architectures. Many variations are contemplated for different applications and design considerations; however, for brevity and clarity, all the contemplated variations may not be individually described in the following detailed description. Those skilled in the art will understand how the disclosed examples may be varied, modified, and altered and not depart in substance from the scope of the examples described herein.

A conventional digital media system may include mechanisms for displaying advertisements or sponsored content alongside or within video or image streams. Such systems typically rely on static banners, pre-roll or mid-roll video clips, or generic hyperlinks placed adjacent to the media content. Targeting in conventional systems is often based on broad demographic segments or coarse geographic indicators, and the presentation of actionable controls (for example, "Shop Now" or "Learn More") is generally uniform across viewers. In many instances, these actions simply redirect the viewer to a separate web page or external application, without regard to the viewer's immediate context, location, or intent at the moment of interaction.

In some embodiments, the overlay may be rendered as a static display element, for example as a listed address, a map reference, or a fixed button configured to direct the user to a merchant, fulfillment service, or mapping service. Even when rendered without animation, highlighting, or other interactive embellishments, such static indicators fall within the scope of the claimed overlay embodiments. The embodiments may include instances in which a static pinned address, a "Shop Now" link, or a fixed location tag is rendered adjacent to or in association with media content. The system may provide a contextual linkage between media content, geographic indicators, and actionable commerce functions. Such linkage can be achieved irrespective of whether an associated indicator is animated, highlighted, or rendered in a fixed or static manner.

The current state of the art presents several limitations. First, viewers frequently encounter friction because they must leave the hosting application to complete an action, such as placing a food order or booking an event. This results in lower conversion rates and disengagement. Second, conventional targeting mechanisms do not account for real-time contextual factors, such as a viewer's current geographic position, behavioral history, or device capabilities, meaning many overlays are irrelevant or ill-timed. Third, creators or businesses that lack established e-commerce integrations are unable to provide dynamic, actionable links within their media, leading to missed monetization opportunities. Collectively, these issues limit the effectiveness of existing systems for both users and providers.

Implementations of a contextual overlay generation system may address some or all of the problems described above. A contextual overlay generation system may include a client device configured to analyze digital media streams, a context determination module that generates real-time viewer context signals, a content analysis module that extracts contextual attributes from the media, and a correlation engine that produces a relevance score. The system may further include a user interface generator that renders dynamic overlays, a transaction module that constructs provider-specific actions, a monetization module that appends affiliate or campaign identifiers, and a deferred engagement module that manages saved opportunities for resurfacing. Collectively, these components allow overlays to be personalized, relevant, and immediately actionable within the hosting platform.

Generally, disclosed embodiments provide in-stream overlays that adapt dynamically to both the subject matter of the content and the contextual attributes of the viewer. By integrating real-time location data, engagement behavior, and device capabilities, the system ensures that only feasible and timely actions are presented. By incorporating provider link generation and affiliate metadata, the system enables businesses and creators to participate even without prior integrations, thereby increasing monetization opportunities. And by supporting in-app completion as well as deferred "save for later" triggers, disclosed embodiments reduce friction, improve conversion rates, and extend the utility of digital media beyond passive consumption into an actionable, context-aware experience.

FIG. 1 illustrates an interactive multimedia engagement system 100, according to an embodiment. The system includes internal and external data resources for managing a project. It may reduce memory allocation at client devices and conserve memory resources for application servers.

The interactive multimedia engagement system 100 may include a cloud-based data management system 102 and a user device 104. The cloud-based data management system 102 may include an application server 106, a database 108, and a data server 110. The user device 104 may include one or more devices associated with user profiles of the interactive multimedia engagement system 100, such as a smartphone 112 and/or a personal computer 114. The interactive multimedia engagement system 100 may include external resources such as an external application server 116 and/or an external database 118. The interactive multimedia engagement system 100 elements may communicate via various communication links 120. An external resource may generally be considered a data resource owned and/or operated by an entity other than an entity that utilizes the cloud-based data management system 102 and/or the user device 104.

The interactive multimedia engagement system 100 may be web-based. The user device 104 may access the cloud-based data management system 102 via an online portal set up and/or managed by the application server 106. The interactive multimedia engagement system 100 may be implemented using a public internet. The interactive multimedia engagement system 100 may be implemented using a private intranet. Elements of the interactive multimedia engagement system 100, such as the database 108 and/or the data server 110, may be physically housed at a location remote from an entity that owns and/or operates the interactive multimedia engagement system 100. For example, various elements of the interactive multimedia engagement system 100 may be physically housed at a public service provider such as a web services provider. The interactive multimedia engagement system 100 elements may be physically housed at a private location, such as at a location occupied by the entity that owns and/or operates the project management system 100.

The communication links 120 may be direct or indirect. A direct link may include a link between two devices where information is communicated from one device to the other without passing through an intermediary. For example, the direct link may include a Bluetooth® connection, a Zigbee® connection, a Wi-Fi® Direct™ connection, a near-field communications (NFC) connection, an infrared connection, a wired universal serial bus (USB) connection, an ethernet cable connection, a fiber-optic connection, a firewire connection, a microwire connection, and so forth. In another example, the direct link may include a cable on a bus network. "Direct," when used regarding the communication links 120, may refer to any of the aforementioned direct communication links.

An indirect link may include a link between two or more devices where data may pass through an intermediary, such as a router, before being received by an intended recipient of the data. For example, the indirect link may include a wireless local area network (WLAN) connection where data is passed through a WLAN router, a cellular network connection where data is passed through a cellular network router, a wired network connection where devices are interconnected through hubs and/or routers, and so forth. The cellular network connection may be implemented according to one or more cellular network standards, including the global system for mobile communications (GSM) standard, a code division multiple access (CDMA) standard such as the universal mobile telecommunications standard, an orthogonal frequency division multiple access (OFDMA) standard such as the long term evolution (LTE) standard, and so forth. "Indirect," when used regarding the communication links 120, may refer to any of the aforementioned indirect communication links.

Figure 2:
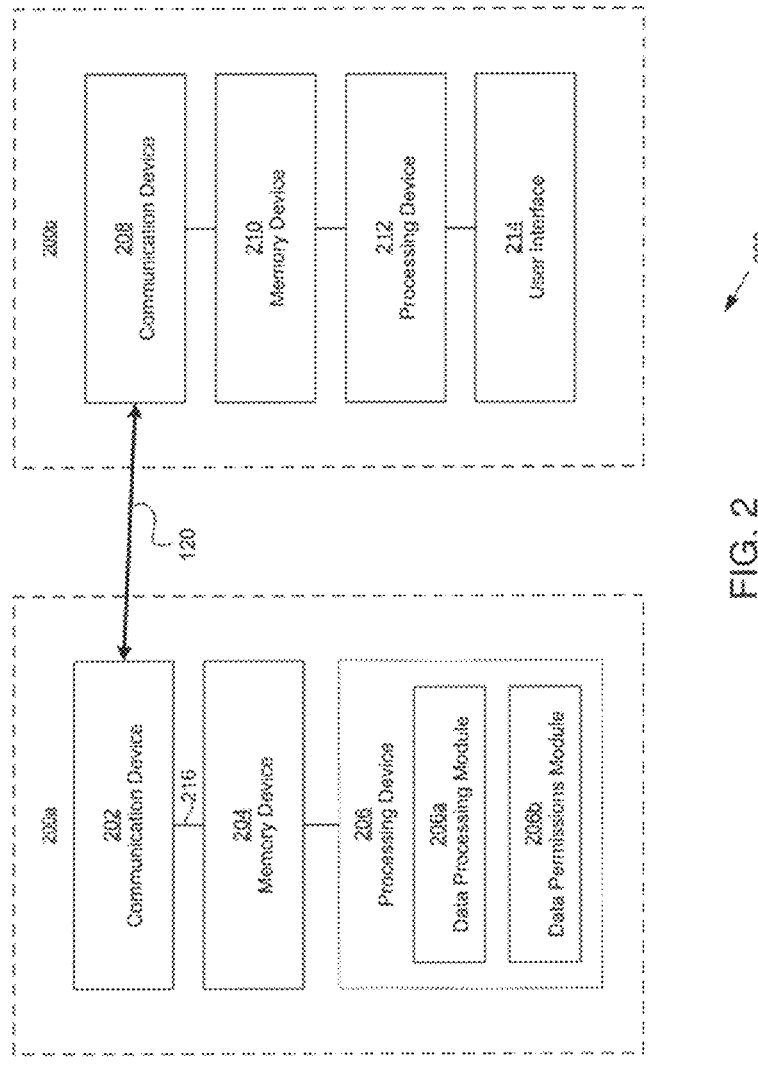
FIG. 2 illustrates a device schematic for various devices used in the interactive multimedia engagement system, according to an embodiment.

FIG. 2 illustrates a device schematic 200 for various devices used in the interactive multimedia engagement system 100, according to an embodiment. A server device 200*a* may moderate data communicated to a client device 200*b* based on data permissions to minimize memory resource allocation at the client device 200*b*.

The server device 200a may include a communication device 202, a memory device 204, and a processing device 206. The processing device 206 may include a data processing module 206a and a data permissions module 206b, where module refers to specific programming that governs how data is handled by the processing device 206. The client device 200b may include a communication device 208, a memory device 210, a processing device 212, and a user interface 214. Various hardware elements within the server device 200a and/or the client device 200b may be interconnected via a system bus 216. The system bus 216 may be and/or include a control bus, a data bus, an address bus, and so forth. The communication device 202 of the server device 200a may communicate with the communication device 208 of the client device 200b.

The data processing module 206a may handle inputs from the client device 200a. The data processing module 206a may cause data to be written and stored in the memory device 204 based on the input(s) from the client device 200b. The data processing module 206a may retrieve data stored in the memory device 204 and output the data to the client device 200a via the communication device 202. The data permissions module 206b may determine, based on permissions data stored in the memory device, what data to output to the client device 200b and what format to output the data in (e.g., as a static variable, as a dynamic variable, and so forth). For example, a variable that is disabled for a particular user profile may be output as static. When the variable is enabled for the particular user profile, the variable may be output as dynamic.

The server device 200a may represent the cloud-based data management system 102. The server device 200a may be representative of the application server 106. The server device 200a may be representative of the data server 110. The server device 200a may be representative of the external application server 116. The memory device 204 may be representative of the database 108, and the processing device 206 may be representative of the data server 110. The memory device 204 may be representative of the external database 118, and the processing device 206 may represent the external application server 116. For example, the database 108 and/or the external database 118 may be implemented as a block of memory or memory block in the memory device 204. The memory device 204 may further store instructions that, when executed by the processing device 206, perform various functions with the data stored in the database 108 and/or the external database 118.

Similarly, the client device 200b may represent the user device 104. The client device 200b may be representative of the smartphone 112. The client device 200b may be representative of the personal computer 114. The memory device 210 may store application instructions that, when executed by the processing device 212, cause the client device 200b to perform various functions associated with the instructions, such as retrieving data, processing data, receiving input, processing input, transmitting data, and so forth.

As stated above, the server device 200a and the client device 200b may represent various interactive multimedia engagement system 100 devices. Various elements of the interactive multimedia engagement system 100 may include data storage and/or processing capabilities. Such capabilities may be rendered by various electronics for processing and/or storing electronic signals. One or more of the interactive multimedia engagement system 100 devices may include a processing device. For example, the cloud-based data management system 102, the user device 104, the smartphone 112, the personal computer 114, the external application server 116, and/or the external database 118 may include a processing device. One or more of the interactive multimedia engagement system 100 devices may include a memory device. For example, the cloud-based data management system 102, the user device 104, the smartphone 112, the personal computer 114, the external application server 116, and/or the external database 118 may include the memory device.

The processing device may have volatile and/or persistent memory. The memory device may have volatile and/or persistent memory. The processing device may have volatile memory, and the memory device may have persistent memory. Memory in the processing device may be allocated dynamically according to variables, variable states, static objects, and permissions associated with objects and variables in the interactive multimedia engagement system 100. Such memory allocation may be based on instructions stored in the memory device. Memory resources at a specific device may be conserved relative to other systems that do not associate variables and other objects with permission data for the specific device.

The processing device may generate an output based on an input. For example, the processing device may receive an electronic and/or digital signal. The processing device may read the signal and perform one or more tasks with the signal, such as performing various functions with data in response to input received by the processing device. The processing device may read information needed to perform the functions from the memory device. For example, the processing device may update a variable from static to dynamic based on a received input and a rule stored as data on the memory device. The processing device may send an output signal to the memory device, and the memory device may store data according to the signal output by the processing device.

The processing device may be and/or include a processor, a microprocessor, a computer processing unit (CPU), a graphics processing unit (GPU), a neural processing unit (NPU), a physics processing unit (PPU), a digital signal processor (DSP), an image signal processor (ISP), a synergistic processing element (SPE), a field-programmable gate array (FPGA), a sound chip, a multi-core processor or microprocessor, and so forth. As used herein, "processor," "processing component," "processing device," and/or "processing unit" may be used generically to refer to any or all of the aforementioned specific devices, elements, and/or features of the processing device.

The memory device may be and/or include a computer processing unit register, a cache memory, a magnetic disk, an optical disk, a solid-state drive, and so forth. The memory device may be configured with random access memory (RAM), read-only memory (ROM), static RAM, dynamic RAM, masked ROM, programmable ROM, erasable and programmable ROM, electrically erasable and programmable ROM, and so forth. As used herein, "memory," "memory component," "memory device," and/or "memory unit" may be used generically to refer to any or all of the aforementioned specific devices, elements, and/or features of the memory device.

Various devices in the interactive multimedia engagement system 100 may include data communication capabilities. Such capabilities may be rendered by various electronics for transmitting and/or receiving electronic and/or electromagnetic signals. One or more of the interactive multimedia engagement system 100 devices may include a communication device, e.g., the communication device 202 and/or the communication device 208. For example, the cloud-based data management system 102, the user device 104, the smartphone 112, the personal computer 114, the application server 116, and/or the external database 118 may include a communication device.

The communication device may include, for example, a networking chip, one or more antennas, and/or one or more communication ports. The communication device may generate radio frequency (RF) signals and transmit the RF signals via one or more of the antennas. The communication device may receive and/or translate the RF signals. The communication device may transceive the RF signals. The RF signals may be broadcast and/or received by the antennas.

The communication device may generate electronic signals and transmit the RF signals via one or more of the communication ports. The communication device may receive RF signals from one or more of the communication ports. The electronic signals may be transmitted to and/or from a communication hardline by the communication ports. The communication device may generate optical signals and transmit the optical signals to one or more of the communication ports. The communication device may receive the optical signals and/or may generate one or more digital signals based on the optical signals. The optical signals may be transmitted to and/or received from a communication hardline by the communication port, and/or the optical signals may be transmitted and/or received across open space by the networking device.

The communication device may include hardware and/or software for generating and communicating signals over a direct and/or indirect network communication link. For example, the communication component may include a USB port, a USB wire, and/or an RF antenna with Bluetooth® programming installed on a processor, such as the processing component, coupled to the antenna. In another example, the communication component may include an RF antenna and programming installed on a processor, such as the processing device, for communicating over a Wi-Fi® and/or cellular network. As used herein, "communication device," "communication component," and/or "communication unit" may be used generically herein to refer to any or all of the aforementioned elements and/or features of the communication component.

Various elements in the interactive multimedia engagement system 100 may be referred to as a "server." Such elements may include a server device. The server device may include a physical server and/or a virtual server. For example, the server device may include one or more bare-metal servers. The bare-metal servers may be single-tenant servers or multiple-tenant servers. In another example, the server device may include a bare metal server partitioned into two or more virtual servers. The virtual servers may include separate operating systems and/or applications from each other. In another example, the server device may include a virtual server distributed on a cluster of networked physical servers. The virtual servers may include an operating system and/or one or more applications installed on the virtual server and distributed across the cluster of networked physical servers. In another example, the server device may include more than one virtual server distributed across a cluster of networked physical servers.

The term server may refer to the functionality of a device and/or an application operating on a device. For example, an application server may be programming instantiated in an operating system installed on a memory device and run by a processing device. The application server may include instructions for receiving, retrieving, storing, outputting, and/or processing data. A processing server may be programming instantiated in an operating system that receives data, applies rules to data, makes inferences about the data, and so forth. Servers referred to separately herein, such as an application server, a processing server, a collaboration server, a scheduling server, and so forth, may be instantiated in the same operating system and/or on the same server device. Separate servers may be instantiated in the same application or different applications.

Various aspects of the systems described herein may be referred to as "data." Data may refer generically to modes of storing and/or conveying information. Accordingly, data may refer to textual entries in a database table. Data may refer to alphanumeric characters stored in a database. Data may refer to machine-readable code. Data may refer to images. Data may refer to audio. Data may refer to, more broadly, a sequence of one or more symbols. The symbols may be binary. Data may refer to a machine state that is computer-readable. Data may refer to human-readable text.

Various devices in the interactive multimedia engagement system 100, including the server device 200a and/or the client device 200b, may include a user interface for outputting information in a format perceptible by a user and receiving input from the user, e.g., the user interface 214. The user interface may include a display screen such as a light-emitting diode (LED) display, an organic LED (OLED) display, an active-matrix OLED (AMOLED) display, a liquid crystal display (LCD), a thin-film transistor (TFT) LCD, a plasma display, a quantum dot (QLED) display, and so forth. The user interface may include an acoustic element such as a speaker, a microphone, and so forth. The user interface may include a button, a switch, a keyboard, a touch-sensitive surface, a touchscreen, a camera, a fingerprint scanner, and so forth. The touchscreen may include a resistive touchscreen, a capacitive touchscreen, and so forth.

The user interface plays a critical role in the overall user experience of the interactive multimedia engagement system 100. A well-designed user interface enhances usability by providing intuitive navigation, clear visual feedback, and efficient access to features and functions. By incorporating advanced display technologies and interactive elements, the system ensures that users can interact with the project management tools effectively and efficiently.

The interactive multimedia engagement system 100 may also integrate artificial intelligence (AI) and machine learning capabilities to enhance data processing and decision-making processes. AI and machine learning algorithms may analyze project data, predict potential issues, and suggest optimal solutions. These technologies enable the system to learn from past project data and improve its performance and accuracy. Newer types of devices, such as neural processing units (NPUs) and advanced GPUs, may be utilized to accelerate AI and machine learning computations.

The interactive multimedia engagement system 100 may leverage cloud-based computing resources to provide scalable and flexible data processing and storage solutions. Cloud-based storage systems ensure that project data is securely stored and easily accessible from any location, facilitating collaboration among geographically dispersed teams. Cloud-based networking enables seamless communication and data exchange between the various components of the system, ensuring real-time updates and synchronization. Depending on the system architecture, these cloud-based components may be optional, allowing for flexible implementation based on specific project requirements.

The interactive multimedia engagement system 100 may utilize mesh network technology to enhance connectivity and reliability. Mesh networks allow for decentralized communication where each node in the network can act as a relay point, ensuring robust and fault-tolerant connections. This is particularly useful in dynamic and large-scale project environments where traditional network infrastructure may be inadequate.

Cybersecurity features may be implements as part of the interactive multimedia engagement system 100. Robust security measures, such as encryption, secure access controls, and regular security audits, are implemented to protect sensitive project data from unauthorized access and cyber threats. Data integrity and confidentiality is paramount to maintaining user trust and compliance with regulatory standards.

Integrating AI, machine learning, cloud-based computing, cloud-based storage, cloud-based networking, and mesh networks in the interactive multimedia engagement system 100 represents a significant advancement in project management technology. These innovations enable the system to provide enhanced efficiency, reliability, and scalability, ultimately leading to more successful project outcomes. The interactive multimedia engagement system 100 may be designed to be scalable and adaptable.

Figure 3:
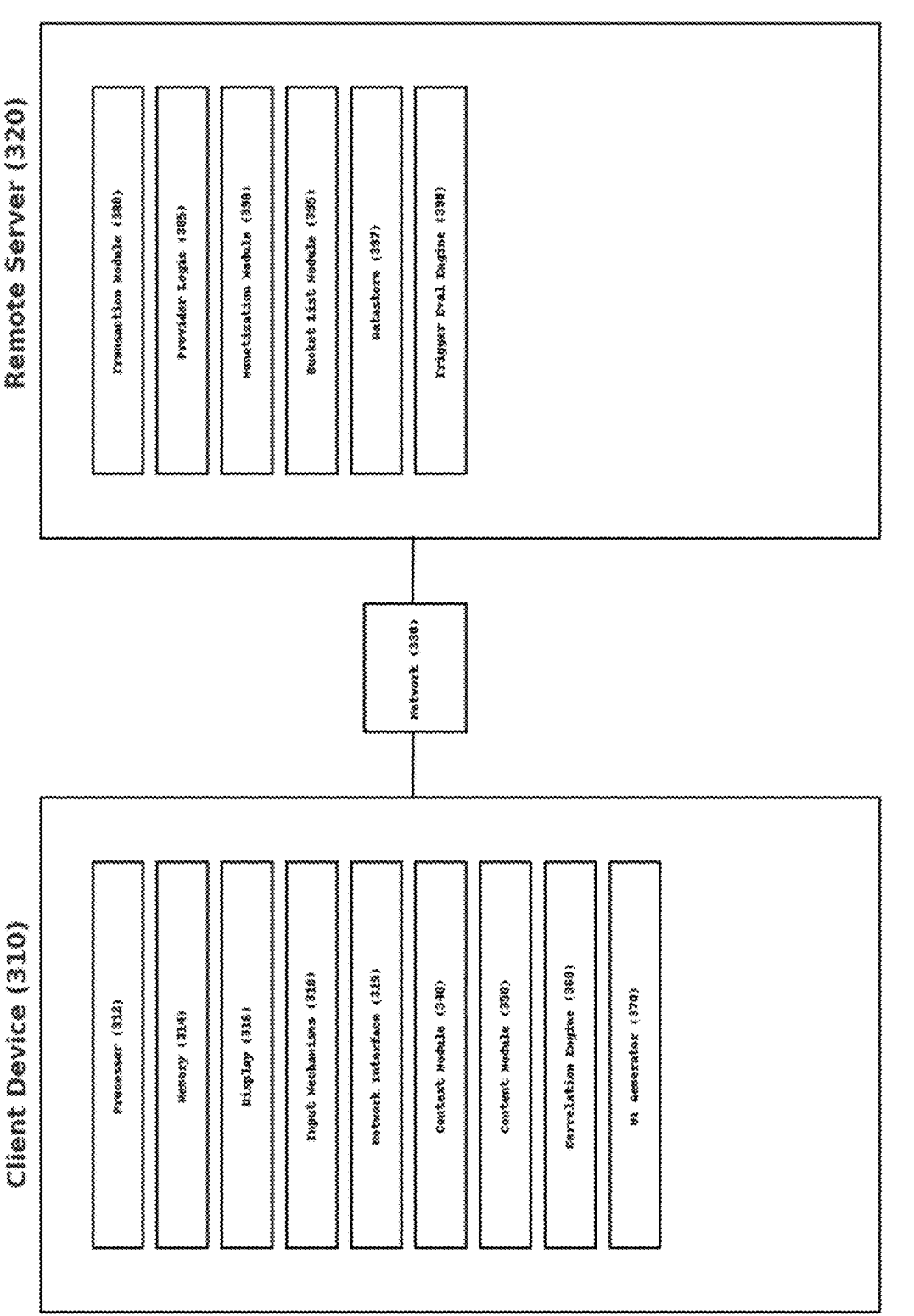
FIG. 3 illustrates a first graphical user interface for accessing project data at a client device, according to an embodiment.

FIG. 3 representatively illustrates a system 300 configured to generate, process, and display actionable overlays within a digital media environment, according to an embodiment. Specifically, such overlays are automatically contextualized by one or more viewer contextual attributes and by the subject matter of the media content. The contextual attributes may include, without limitation, a viewer's geographic location, demographic profile, behavioral interaction history, device capability state, or temporal engagement state. System 300 comprises a client device 310, a remote server 320, and a network 330 enabling bidirectional communication between them. The system operates by generating and transmitting a plurality of structured signals, each carrying well-defined data fields, and by executing algorithms both locally on the client device and remotely on the server to refine, interpret, and act upon the information. In operation, these signals are serialized, validated, and exchanged in real time to support the generation of overlays that are responsive to both the content being consumed and the viewer's present context.

The client device 310 forms the primary endpoint for viewer interaction and is configured to both consume digital media streams and to render actionable overlays in real time. Client device 310 comprises a processor 312, a memory 314, a display 316, one or more input mechanisms 318, and a network interface 319. The processor 312 may be a central processing unit, a graphics processing unit, a digital signal processor, or a system-on-chip integrating heterogeneous cores. In some embodiments, processor 312 incorporates a neural processing unit dedicated to accelerating inference tasks such as image recognition, speech transcription, or contextual similarity scoring. In augmented reality embodiments, processor 312 may further comprise an image signal processor configured to preprocess camera frames for object detection prior to analysis by content analysis module 350. In operation, processor 312 executes both low-level signal normalization (e.g., translating touchscreen taps into structured events) and high-level inference (e.g., applying a trained model to determine if an overlay should be presented).

Memory 314 includes both volatile and non-volatile components and stores operating system code, runtime libraries, and executable instructions for modules such as the context determination module 340, the content analysis module 350, the correlation engine 360, and the user interface generator 370. Memory 314 may also store cached overlay instructions, deferred engagement records associated with bucket list module 395, and secure storage regions containing authentication tokens and cryptographic keys necessary for secure transactions. In an embodiment, memory 314 is partitioned such that application code runs in general memory regions while tokens and keys are stored in a secure enclave, isolating sensitive data from potentially compromised applications.

Display 316 is configured to render both the primary media content and overlay controls generated by the user interface generator 370. In smartphone embodiments, display 316 may be an OLED panel capable of adaptive refresh, while in AR or VR embodiments, display 316 may be a stereoscopic micro-OLED designed for spatial anchoring of overlays. Overlays are rendered through compositing pipelines in which overlay instruction signals 371 are interpreted into graphical primitives and blended atop decoded video frames. Synchronization between overlays and content may be accomplished by timecode alignment, where overlay rendering is delayed or advanced to ensure consistency with the underlying frame sequence.

Input mechanisms 318 are adapted to capture viewer interaction and may include a touchscreen, a keyboard, a microphone for voice commands, a camera for gesture recognition, or gaze-tracking sensors. These mechanisms generate raw events which are normalized by processor 312 into structured interaction signals 373. For example, a gaze dwell exceeding 1.5 seconds on an overlay element may be normalized into an activation event, while a double-tap may be normalized into a reservation confirmation signal. This normalization process ensures consistent downstream handling regardless of the input modality.

The network interface 319 provides connectivity over Wi-Fi, cellular, or wired links and transmits signals such as viewer context signal 341, content context signal 353, and interaction signal 373 to server 320, while receiving overlay instruction signals 371 and transaction confirmation signals 382. In certain embodiments, the network interface 319 supports simultaneous multi-channel operation such that high-bandwidth video streams are transmitted on one channel while lightweight structured signals are transmitted on another, reducing latency for overlay responsiveness.

The remote server 320 provides computationally intensive analysis, transaction handling, and monetization augmentation. Server 320 may host instances of the correlation engine 360 for refined processing, as well as a transaction module 380 responsible for constructing provider-specific transaction instruction signals 381. Server 320 also includes a monetization module 390, which appends monetization metadata signal 391 such as affiliate identifiers or referral codes to transaction requests, ensuring that subsequent transactions can be attributed for auditing and revenue sharing. In some embodiments, server 320 also hosts the bucket list module 395, which maintains a bucket list datastore 397 and a trigger evaluation engine 398 to manage deferred engagements. By offloading these modules to server 320, computational burdens are reduced on client device 310, enabling support for resource-constrained devices such as televisions or thin-client AR displays. The server 320 may additionally maintain logs of signals for debugging, analytics, and auditing purposes, subject to privacy restrictions.

In an embodiment, the transaction module 380 further supports explicit provider selection functionality. The system may present a selectable menu of fulfillment providers, such as DoorDash, Uber Eats, or Grubhub, as well as a direct-to-merchant option for in-house delivery, pickup, or appointment booking. When a provider or merchant self-fulfillment pathway is chosen, the selection is encoded into the transaction instruction signal 381 or equivalent deep link, while order origination and monetization attribution remain controlled at the overlay layer. Provider selection may be automated by system heuristics, specified by the creator, or constrained by host-platform policies. In alternative embodiments, the selection may be updated at runtime based on availability, geographic restrictions, payout structures, or compliance requirements.

In embodiments where the business or creator has not supplied a provider endpoint, the transaction module 380 cooperates with the monetization module 390 to invoke a provider link generator that resolves a provider-specific deep link or API token for the identified entity and market. Given the entity identity from the content context signal 353 and the viewer's market from the viewer context signal 341, the provider link generator queries provider catalogs and public directories, verifies serviceability at the viewer's coordinates, and mints an affiliate-bearing URL or deep link that is returned to transaction module 380 for inclusion in the transaction instruction signal 381. When multiple providers are available, the generated link encapsulates provider-specific metadata (e.g., store ID, menu scope, fulfillment mode) so that completion occurs in-flow without manual navigation.

The network 330 enables bidirectional transport of structured signals between client device 310 and server 320. Network 330 may comprise one or more of the Internet, local area networks, or cellular data networks. In some embodiments, network 330 includes an edge caching layer, such as a content delivery network, which reduces latency in transmitting overlay instruction signals 371. All signals transported over network 330 may be serialized in structured formats such as JSON or Protocol Buffers and secured with transport encryption protocols such as TLS. Signals transmitted over network 330 include, without limitation, viewer context signal 341, content context signal 353, correlation result signal 361, overlay instruction signal 371, interaction signal 373, transaction instruction signal 381, monetization metadata signal 391, transaction confirmation signal 382, viewer confirmation signal 383, bucket list update signal 396, and resurface instruction signal 399. Each signal follows a defined schema to ensure interoperability, with error-handling routines triggered if schema validation fails.

The context determination module 340 is configured to generate viewer context signal 341, which represents one or more attributes of the viewer or client device 310. These attributes may include geographic coordinates derived from GNSS, Wi-Fi triangulation, or cellular timing measurements, demographic categories derived from consented profile data, behavioral vectors computed from past overlay interactions, device descriptors describing screen resolution or sensor availability, and temporal markers such as time-of-day or calendar events. The module may employ estimation algorithms such as extended Kalman filters to fuse multiple input sources into a normalized representation. Viewer context signal 341 is a structured data object containing fields that may include coordinates, uncertainty metrics, demographic tags, behavioral embeddings, and device descriptors. In location-centric embodiments, viewer context signal 341 corresponds specifically to a viewer location signal, comprising latitude, longitude, altitude, timestamp, and accuracy values. In alternative embodiments, the context determination module 340 may employ generic sensor fusion techniques such as Kalman filtering to reconcile disparate sources of location or behavioral data. The use of extended Kalman filters, particle filters, or equivalent probabilistic algorithms is contemplated as exemplary, non-limiting approaches. These implementations provide one possible method for generating the normalized viewer context signal 341, consistent with the general disclosure of fusing multiple data sources to produce a unified context vector.

The content analysis module 350 receives and analyzes a digital media stream 351, which may comprise video frames, still images, or audio tracks. Module 350 generates a content context signal 353, which encodes contextual attributes of entities depicted or referenced within the content. Module 350 may employ convolutional neural networks for image recognition, OCR pipelines for text extraction, and transformer-based automatic speech recognition models for transcription of audio dialogue. Detected entities are resolved against local or remote directories to identify businesses, services, products, or venues. Where multiple candidates are plausible, the content context signal 353 may encode each candidate along with an associated confidence score and the modality from which the evidence was derived. In some embodiments, multimodal fusion algorithms such as joint embedding models reconcile visual, audio, and textual signals into a unified representation for inclusion in signal 353. The content context signal 353 may therefore be considered a structured semantic fingerprint of the content, consumable by correlation engine 360.

The correlation engine 360 receives both viewer context signal 341 and content context signal 353 and produces a correlation result signal 361 quantifying the relevance of the content to the viewer's context. In geographic embodiments, correlation engine 360 computes geodesic distance using Haversine or Vincenty algorithms, or it queries routing APIs to obtain estimated travel times adjusted for real-time traffic. In demographic embodiments, correlation engine 360 computes similarity scores between viewer demographic tags and entity audience tags using cosine similarity or embedding-based classification. In behavioral embodiments, correlation engine 360 predicts likelihood of engagement using machine learning models trained on historical interaction data. In device embodiments, correlation engine 360 determines feasibility by comparing overlay rendering requirements to device descriptors. In temporal embodiments, correlation engine 360 determines whether an entity is actionable by aligning its hours of operation or availability windows to the viewer's current time. The correlation result signal 361 may include fields describing distances, travel times, similarity scores, feasibility indicators, and composite engagement scores.

In some embodiments, the computation of geographic distance within correlation engine 360 may be carried out using standard algorithms such as the Haversine formula or Vincenty's equations for ellipsoidal earth models. These algorithmic references are exemplary and align with the broader disclosure of computing proximity or routing times between a viewer and an entity. The engine remains extensible to other distance or routing estimation methods without departing from the scope of the system.

The user interface generator 370 transforms correlation result signal 361 into overlay instruction signal 371. This signal defines the actionable controls to be presented, the visual layout and styling, the timing of display synchronized to media playback, and any accessibility metadata. Overlay instruction signal 371 may define control types such as "Order," "Reserve," or "Directions," and may specify visual parameters such as size, color scheme, or animation directives. In AR embodiments, overlay instruction signal 371 may define three-dimensional spatial anchors relative to objects within the scene. In personalized embodiments, user interface generator 370 applies reinforcement learning models that prioritize controls most relevant to the viewer based on prior interaction history. In accessibility-focused embodiments, overlay instruction signal 371 includes descriptors enabling screen readers and visual contrast adaptations. The generator may further employ suppression logic, ensuring overlays are only shown when the correlation result signal 361 indicates relevance.

When a viewer engages with an overlay, input mechanisms 318 generate raw events which processor 312 normalizes into interaction signal 373. Interaction signal 373 includes an overlay identifier, the activation event, a timestamp, and contextual parameters such as viewer tokens or session identifiers. Interaction signal 373 is transmitted via network 330 to server 320, where transaction module 380 maps it to a provider-specific action. Transaction module 380 constructs transaction instruction signal 381, which includes the business identifier, viewer context parameters necessary for fulfillment, and secure authentication tokens. If multiple providers are available, provider selection logic 385 applies weighted algorithms considering factors such as provider commission, latency, and promotional bonuses. Monetization module 390 appends monetization metadata signal 391, which includes affiliate identifiers, campaign codes, or cost-per-action references. The combined instruction is transmitted to the third-party provider, which responds with a transaction confirmation signal 382. Server 320 translates this into viewer confirmation signal 383, which is transmitted back to client device 310 and rendered as a confirmation overlay on display 316.

Provider selection logic 385 ranks candidate providers using a payout-aware objective that accounts for base affiliate rate, campaign-specific multipliers, new-merchant bounty eligibility, historical reliability, latency to first byte, and viewer preference. The logic supports jurisdictional and category constraints (e.g., alcohol restrictions), and where scores are within a tolerance band it employs controlled randomization to balance inventory and A/B experiments. The selected provider and rationale are recorded in the transaction instruction signal 381 for auditing.

The provider selection logic 385 may in some embodiments implement a payout-aware objective function, wherein candidate providers are scored based on commission rate, campaign multipliers, reliability, latency, and other attributes. This embodiment exemplifies one way of ranking providers, consistent with the earlier disclosure of prioritizing partners based on affiliate rates, onboarding, and monetization opportunities. The factors cited herein should be understood as illustrative examples within a general optimization framework.

Deferred engagement is managed by bucket list module 395. When a viewer elects to save or defer an opportunity, client device 310 generates bucket list update signal 396, which includes entity identifiers, context signatures, trigger conditions, timestamps, and staleness policies. Bucket list update signals 396 are stored in bucket list datastore 397. Trigger evaluation engine 398 periodically evaluates these records against real-world signals. Time triggers compare the current time to specified windows; geofence triggers compute proximity between viewer context signal 341 and stored entity coordinates; and context triggers match content categories or session attributes to deferred records. When a trigger condition is satisfied, bucket list module 395 generates a resurface instruction signal 399. This signal instructs user interface generator 370 to render a reminder overlay on display 316, prompting the viewer to take action. Snooze and dismissal semantics modify record triggers, while cross-device synchronization ensures consistency across multiple client devices.

The bucket list module 395 and resurface instruction signal 399 terminology introduced in the present description provides a structured naming convention for functionality already contemplated by earlier embodiments, which described "Order Later," "Save for Later," and "Remind Me" actions and their resurfacing during time windows or contextual triggers. These signal identifiers are exemplary constructs to clarify pipeline operation and do not introduce new subject matter.

For food-ordering flows initiated during late-night hours, the bucket list module 395 applies a lunch-window heuristic: if the viewer selects Order Later after local quiet hours, the module records a time trigger for the next business day within a configurable lunch band (e.g., 11:00-13:30 local time). When the window opens, trigger evaluation engine 398 emits a resurface instruction signal 399 whose overlay prioritizes Order Now and, where supported, a Schedule for Tonight secondary action.

In operation, system 300 executes a pipeline of signals and modules. Media stream 351 is consumed by content analysis module 350, producing content context signal 353. Context determination module 340 concurrently produces viewer context signal 341. Correlation engine 360 processes signals 341 and 353 into correlation result signal 361. User interface generator 370 transforms signal 361 into overlay instruction signal 371, which is rendered as an actionable control on display 316. Interaction signals 373 generated from viewer input are processed by transaction module 380 into transaction instruction signals 381, augmented by monetization metadata signal 391, and transmitted to third-party providers. Confirmation signals 382 are returned and rendered as viewer confirmation signals 383. Deferred engagements are preserved in bucket list module 395 via bucket list update signals 396 and later reactivated by resurface instruction signals 399.

The system operates irrespective of whether the poster is the business itself or a third-party creator. When a business profile supplies commerce metadata (e.g., reservation or delivery endpoints), the content analysis module 350 and transaction module 380 preferentially use the supplied endpoints. When such metadata is absent, as is typical with creator posts, the provider link generator described herein resolves the endpoints automatically from the entity identity and market context, thereby enabling the same actionable overlays without requiring poster configuration.

To reduce friction and increase conversion, overlay instruction signals 371 specify an embedded completion surface within the hosting application (e.g., a secure webview, SDK sheet, or in-app browser) such that transaction flows proceed without switching to an external app or system browser. Only where platform policy requires an external hand-off does the system fall back to deep-linking, in which case the fall-back is recorded in the interaction signal 373 for analytics.

In certain embodiments, the user interface generator 370 conditions control eligibility and ranking on engagement signals such as likes, follows, dwell time, replays, and comments associated with the current media session. For performers and events, the system exposes a TOUR or BUY TICKETS control when engagement exceeds a threshold and the correlation engine 360 confirms inventory within a proximity band of the viewer coordinates. The resulting overlay instruction signal 371 includes the event identifier and prefiltered city/venue list tied to the viewer's location.

To avoid irrelevant prompts, the system enforces proximity gating on overlays. If the correlation result signal 361 indicates a distance or travel time exceeding a policy threshold (for example, distance >30 miles or travel_time_ minutes>45 for restaurant category content), proximity-dependent controls such as Order and Directions are suppressed and a Save for Later control is presented instead. The gating thresholds are tunable by category and locale and are included as policy fields in overlay instruction signal 371.

When repeated Directions or Save for Later activations are observed for an entity that lacks a supported delivery or reservation integration, the system schedules a business onboarding recommendation. Server 320 compiles a lightweight opportunity brief (e.g., aggregate interest, proximate audience size) and triggers outreach to the entity via platform messaging or an account-manager queue. Upon successful onboarding, provider selection logic 385 updates the provider ranking for that entity, and subsequent overlays may surface Order or Reserve controls with affiliate attribution.

In location-centric embodiments, context determination module 340 operates specifically as a location determination module, and viewer context signal 341 corresponds to a viewer location signal. Content analysis module 350 generates a content location signal 353, correlation engine 360 produces a proximity result signal 361, and overlays are generated accordingly. The remainder of the pipeline, including transaction, monetization, and bucket list modules, operates as described above.

Figure 4:
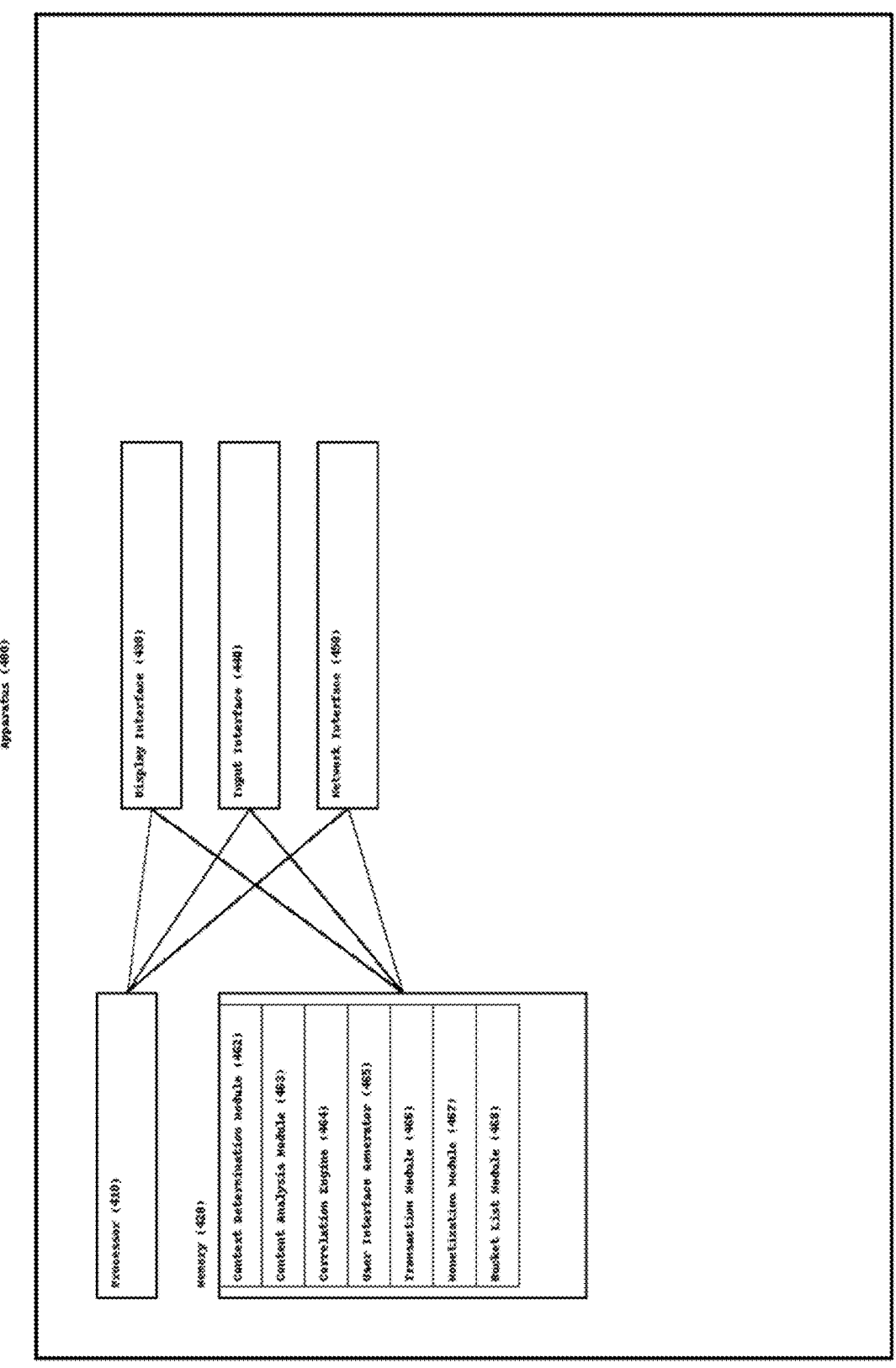
FIG. 4 representatively illustrates an apparatus configured to perform contextual overlay generation and deferred engagement in connection with digital media streams, according to an embodiment.

FIG. 4 representatively illustrates an apparatus 400 configured to perform contextual overlay generation and deferred engagement in connection with digital media streams, according to an embodiment. Apparatus 400 comprises a processor 410, a memory 420, a display interface 430, an input interface 440, a network interface 450, and a plurality of executable modules 460 stored within the memory and executed by the processor. Collectively, these components enable apparatus 400 to analyze media content, determine contextual attributes of a viewer, correlate those attributes with attributes of businesses or events referenced in the media, generate actionable overlays, execute transactions, and manage deferred engagement records. Apparatus 400 therefore functions as a self-contained endpoint or as part of a distributed client-server ecosystem depending on deployment configuration.

In embodiments integrated into host applications, display interface 430 supports an embedded transaction surface (secure webview or SDK sheet) through which user interface generator 465 renders provider flows to completion without leaving the application. The interface exposes capability flags (e.g., payments, SSO, autofill) that transaction module 466 uses to select in-app versus external deep-link execution.

Apparatus 400 may be embodied as a smartphone, a tablet, a laptop computer, a desktop workstation, a smart television, a wearable AR/VR headset, or as a dedicated appliance such as a retail kiosk or restaurant point-of-engagement terminal. In some embodiments, apparatus 400 is realized as a thin client in which most computationally intensive functions are performed remotely by a server, while in other embodiments apparatus 400 is a self-contained embedded device that executes all modules locally. In still other embodiments, apparatus 400 is modular and distributed across multiple devices, such as a smartphone paired with a smartwatch, wherein the display interface 430 operates on one device while the input interface 440 operates on another. In augmented reality deployments, apparatus 400 may comprise lightweight AR glasses tethered to a smartphone that executes the correlation engine 464 and user interface generator 465, thereby distributing computation across heterogeneous devices.

The processor 410 may be a general-purpose CPU, a GPU, a digital signal processor, or a heterogeneous system-on-chip. In one embodiment, processor 410 is a multi-core ARM CPU integrated with a GPU capable of real-time rendering. In another embodiment, processor 410 includes specialized neural processing cores configured to accelerate machine learning inference, such as convolutional neural networks for logo recognition or transformer models for speech analysis. Processor 410 may additionally incorporate a digital signal processor optimized for low-power processing of audio streams and sensor data. In secure computing embodiments, processor 410 integrates a trusted execution environment (TEE) that isolates sensitive operations, such as decryption of authentication tokens or insertion of affiliate codes, ensuring that these operations are insulated from the host operating system. Processor 410 is thus capable of executing instructions implementing all modules 460, including but not limited to context determination module 462, content analysis module 463, correlation engine 464, user interface generator 465, transaction module 466, monetization module 467, and bucket list module 468.

The memory 420 stores executable code and runtime data structures for all modules 460. Volatile memory (such as DRAM) is used for active computations, while non-volatile storage (such as flash memory or SSD) retains trained model weights, cached directory entries, and deferred engagement records. Memory 420 may be logically partitioned into separate regions, with secure regions storing cryptographic material and authentication credentials used by transaction module 466 and monetization module 467. In one embodiment, memory 420 stores serialized overlay instruction signals and resurface instruction signals for rapid retrieval when rendering overlays. In another embodiment, memory 420 maintains a rolling cache of content embeddings produced by content analysis module 463, thereby allowing apparatus 400 to quickly resolve repeat entities without recomputation.

Where the poster has not provided a provider endpoint, processor 410 executes code paths in transaction module 466 and monetization module 467 that instantiate a provider link generator. This component resolves a serviceable endpoint for the entity and market, mints an affiliate-bearing deep link, and returns the link to transaction module 466 for inclusion in transaction instruction signal 381.

The display interface 430 drives a physical display device. In one embodiment, the display interface 430 outputs composited video streams to an OLED screen, layering overlays generated by user interface generator 465 above the base content. The interface may employ hardware compositors that combine multiple graphical layers in real time. In augmented reality embodiments, display interface 430 outputs stereoscopic objects that appear spatially anchored within the viewer's field of view, ensuring that overlays remain consistent with the spatial geometry of the real-world scene. In accessibility-oriented embodiments, display interface 430 modifies overlays to high-contrast or large-font versions so that they remain usable by visually impaired users. In still other embodiments, display interface 430 is configured to transmit overlay-rendering directives to an external display device over HDMI, DisplayPort, or wireless casting protocols, thereby enabling apparatus 400 to control overlays on remote displays.

The input interface 440 is configured to capture viewer interactions. Depending on the embodiment, input interface 440 may include capacitive touch sensors, a hardware keyboard, microphones, gesture recognition cameras, or gaze-tracking sensors. In AR headsets, input interface 440 may further include inertial measurement units (IMUs) that track head orientation, enabling gaze-directed selection of overlays. Raw interaction events are captured and normalized by processor 410 into structured interaction signals, which are consumed by transaction module 466 or bucket list module 468. This normalization process may include debouncing, error correction, and multimodal fusion, wherein simultaneous voice and gesture input is combined into a single interaction command.

The network interface 450 provides connectivity between apparatus 400 and external networks. It may include Wi-Fi radios, 4G/5G cellular modems, or wired Ethernet interfaces. In some embodiments, network interface 450 supports multiplexed connections to allow simultaneous streaming of media content and transmission of structured overlay signals. Network interface 450 is configured to transmit viewer context signals, content context signals, transaction instruction signals, and resurface instruction signals, while receiving overlay instruction signals and transaction confirmation signals. All communication may be encrypted using TLS or IPsec. In bandwidth-constrained embodiments, network interface 450 compresses signals before transmission and batches non-urgent signals, such as bucket list updates, to conserve resources. In low-latency embodiments, real-time transport protocols such as QUIC or WebRTC data channels are used for delivering overlay updates with minimal delay.

The context determination module 462, when executed by processor 410, generates viewer context signal 341, which may include location vectors, behavioral embeddings, device descriptors, or temporal indicators. Module 462 may fuse GNSS, Wi-Fi, and cellular data to output normalized geographic coordinates. In alternative embodiments, module 462 retrieves demographic or behavioral features from secure profile storage, encrypts them, and provides them to correlation engine 464 without exposing raw identifiers. The module may additionally perform temporal state analysis, tagging signals with contextual labels such as "morning commute" or "prime-time leisure" to enhance downstream decision-making.

The content analysis module 463 processes the digital media stream received via display interface 430. It may sample video frames, transcribe audio tracks, and apply multimodal inference pipelines to generate content context signal 353. Module 463 is capable of logo recognition using convolutional neural networks, OCR on signage using specialized text detection models, and named-entity recognition from speech transcripts using transformer-based language models. In one embodiment, content analysis module 463 employs a multimodal fusion engine that aligns visual, textual, and auditory features into a joint embedding space, thereby allowing ambiguous references in video to be resolved with higher confidence. The module produces structured metadata describing businesses, products, or events depicted in the media.

The correlation engine 464 compares viewer context signal 341 to content context signal 353 and generates correlation result signal 361. Depending on which attributes are present, the correlation engine 464 computes geodesic distance, travel times, demographic similarity, behavioral alignment, or device feasibility. In one embodiment, correlation engine 464 calls a routing API to determine live travel time estimates, caches the results, and returns both absolute distance and contextualized travel times. In another embodiment, the engine executes an embedding similarity computation, scoring the alignment of viewer behavioral embeddings with product category embeddings extracted from content. The result signal is structured as a JSON or binary object with distance, similarity scores, and composite engagement values, which are then provided to user interface generator 465.

The user interface generator 465 consumes correlation result signal 361 and generates overlay instruction signal 371. This signal specifies the actionable controls to be displayed, the layout and styling, synchronization with video playback, and accessibility metadata. The display interface 430 then renders the overlays on screen. In some embodiments, overlay instruction signal 371 includes animation metadata defining entry and exit transitions, opacity blending, and interactive affordances such as hover highlights. In AR embodiments, overlays may include three-dimensional bounding boxes that appear spatially locked to detected surfaces in the environment.

In some embodiments, the system may generate and present an indicator that conveys whether a merchant, restaurant, or service referenced within a digital media stream is local or geographically proximate to the viewer. The indicator may take any of a variety of sensory forms, including but not limited to a blinking or pulsing textual label, a highlighted or color-shifted text notice, a graphical icon superimposed near the merchant's name, an audible tone or spoken prompt, or a tactile response such as a vibration on a handheld device. These cues may be used to draw the user's attention to the locality of the offering and may be triggered based on correlation engine outputs, such as computed travel time, geodesic distance, or contextual engagement scores.

In some embodiments, the system can place the locality indicator directly within or alongside actionable interface elements, such as purchase buttons, reservation links, or "add to list" options presented in a smart banner. Incorporating the "Local" or "Nearby" notice into the very controls a user interacts with ensures that proximity information is delivered at the moment the user is making a decision. This approach covers both dynamic forms, like flashing or animated labels, and static forms, like a fixed "Local" tag. By doing so, it prevents platforms from skirting the feature by showing a simple "Local" text outside the banner flow.

The transaction module 466 receives interaction signals from input interface 440 and converts them into transaction instruction signals 381, which are formatted according to provider APIs. The module maps overlay identifiers to provider endpoints, populates request fields with viewer context parameters, and inserts authentication tokens. Idempotency keys ensure that repeated inputs do not generate duplicate transactions. In certain embodiments, transaction module 466 incorporates fallback policies, wherein if a provider API is unreachable, the transaction is queued locally until connectivity is restored.

The monetization module 467 appends monetization metadata signal 391, which may include affiliate identifiers, referral codes, or cost-per-action tokens. Module 467 may also log attribution events and transmit periodic reports to a revenue management server for auditing. In some embodiments, monetization module 467 dynamically selects between multiple affiliate programs, prioritizing those with higher commission rates.

The bucket list module 468 manages deferred engagements. When a viewer selects an option to save an entity for later, module 468 stores the associated record in memory 420 and generates a bucket list update signal 396. A trigger evaluation process periodically evaluates stored records against current context signals. When triggers such as time windows or geofence conditions are satisfied, module 468 generates a resurface instruction signal 399, which is rendered on display 316 as a reminder overlay. In one embodiment, triggers are evaluated locally every 30 seconds using lightweight computations. In another embodiment, trigger evaluation is delegated to a cloud service, which periodically transmits resurface instructions back to apparatus 400.

Figure 5:
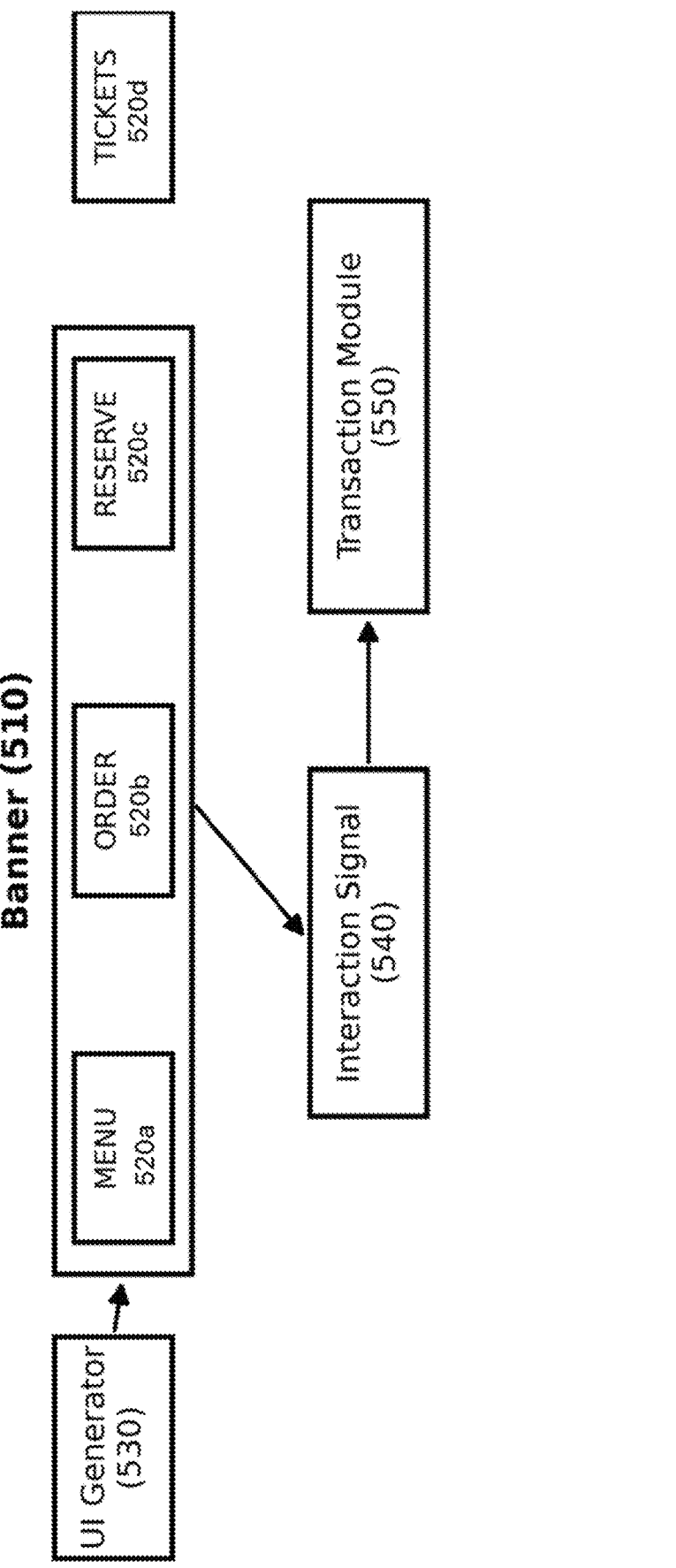
FIG. 5 illustrates an embodiment of a horizontal interactive banner rendered across the upper region of a digital media interface, according to an embodiment.

FIG. 5 illustrates an embodiment of a horizontal interactive banner 510 rendered across a digital media interface, such as a video feed or social media stream, according to an embodiment. The banner 510 includes a series of selectable buttons, which may be labeled "MENU" 520a, "ORDER" 520b, "RESERVE" 520c, or "TICKETS" 520d among other possible actions. The buttons 520 are arranged in a compact, linear format that enables rapid user engagement while minimizing visual interference with the underlying media content. A user interface generator 530 dynamically composes the banner 510 based on overlay instruction signals, determining the order of buttons, the visual styling, and animation parameters. When a viewer engages with one of the buttons 520, the input is normalized into an interaction signal 540. The interaction signal 540 includes metadata identifying the selected control, the context of activation, and any associated viewer attributes. This interaction signal 540 is then transmitted to a transaction module 550, which maps the input to a provider-specific action such as initiating an order, reserving a service, or purchasing tickets. This arrangement enables actionable controls to remain persistently available throughout playback or to adaptively fade or resurface based on dwell time, gaze fixation, or behavioral engagement scores provided by the correlation engine.

Figure 6:
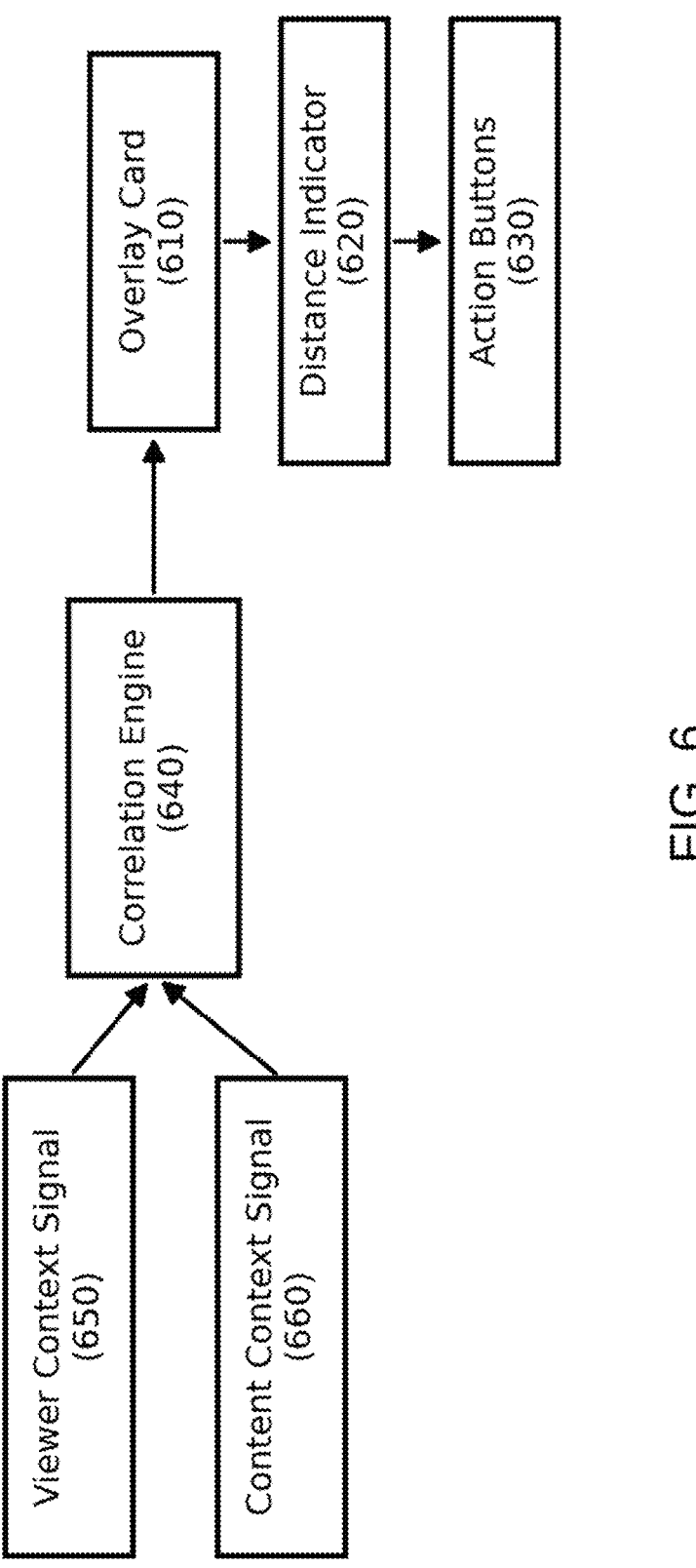
FIG. 6 representatively illustrates a proximity-aware overlay system, according to an embodiment.

FIG. 6 representatively illustrates a proximity-aware overlay system 600 configured to generate actionable user interface elements in response to contextual correlation, according to an embodiment. The system includes a correlation engine 640 that ingests both a viewer context signal 650 and a content context signal 660. The viewer context signal 650 may encapsulate location vectors derived from GNSS, Wi-Fi triangulation, or cellular data, as well as behavioral or device descriptors as described previously. The content context signal 660 encodes attributes of the media content being analyzed, such as the geographic location of a business, event venue, or service provider depicted or referenced within the video stream. Together, signals 650 and 660 are fused within the correlation engine 640, which computes a proximity score, estimated travel times, and feasibility metrics that determine whether an overlay should be generated.

The output of the correlation engine 640 is provided to an overlay card 610, which serves as the primary graphical container rendered within the video playback frame. The overlay card 610 presents a concise summary of actionable context, often in the form of a visually distinct tile positioned non-intrusively on the display. Within the card, contextual icons, such as a map pin, walking figure, vehicle, or airplane, may be displayed alongside descriptive text indicating real-time distance and travel duration to the referenced entity. For example, an overlay may read "2.8 miles·7 min drive," dynamically calculated by the correlation process. The overlay card 610 thereby transforms abstract correlation results into user-legible information suitable for immediate decision-making.

Associated with the overlay card 610 is a distance indicator 620, which encodes the computed proximity metrics in a structured and accessible format. The distance indicator 620 may take the form of a numerical distance (e.g., miles or kilometers), a travel-time estimate, or a feasibility flag derived from temporal and device-capability checks. This element ensures that the overlay communicates not merely the existence of an opportunity but its practical accessibility given the viewer's current location and circumstances. The distance indicator 620 is updated in near real time as the viewer's context changes, such as when the viewer is in transit.

Beneath the proximity information, the overlay presents one or more action buttons 630. The action buttons 630 are interactive affordances, such as "GET DIRECTIONS," "BOOK NOW," "RESERVE," or "VIEW OFFER," that allow the viewer to engage directly with the contextual opportunity. Eligibility and ranking of these buttons are conditioned on overlay instruction signals and policy thresholds, such as proximity gating rules that suppress engagement if the destination is too distant. Personalization logic may further tailor which buttons are shown. For example, a user identified as a frequent ride-share customer may be offered a "Book Ride" control, while a user enrolled in a loyalty program may see "Redeem Offer." Thus, the action buttons 630 transform contextual awareness into actionable steps directly within the media environment.

Collectively, the flow depicted in FIG. 6 demonstrates how the viewer context signal 650 and content context signal 660 converge at the correlation engine 640, producing contextual data that drives the rendering of an overlay card 610. This card integrates the distance indicator 620 and action buttons 630, resulting in a dynamic, proximity-aware overlay. By providing immediate, location-specific engagement options without requiring the viewer to leave the content stream, this embodiment exemplifies the integration of real-time context analysis with graphical overlay presentation to increase relevance, usability, and conversion opportunities.

Figure 7:
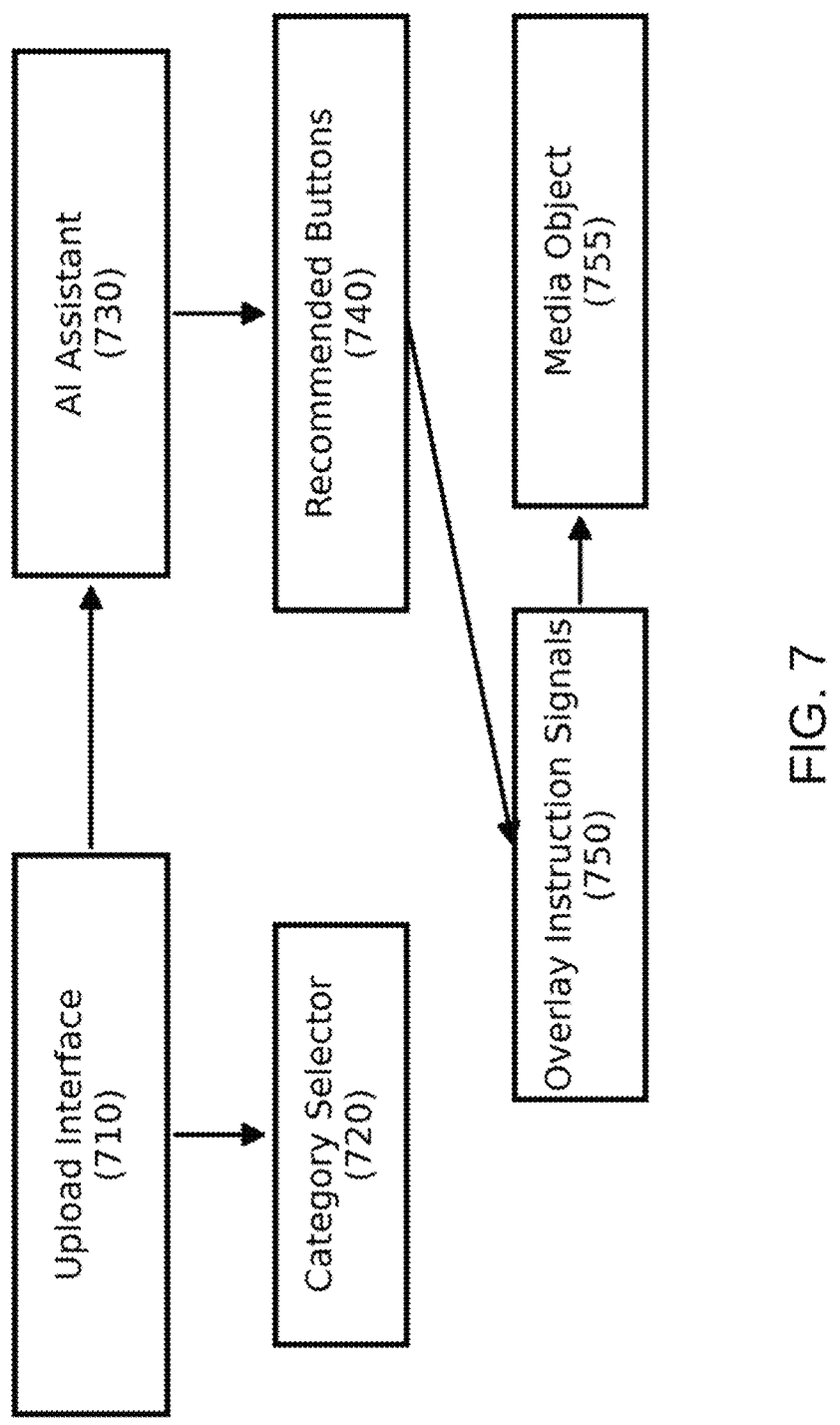
FIG. 7 representatively illustrates an AI-assisted configuration interface designed to aid content creators or publishers when uploading digital media, according to an embodiment.

FIG. 7 representatively illustrates an AI-assisted configuration interface 700 designed to aid content creators or publishers when uploading digital media, according to an embodiment. At the entry point, an upload interface 710 provides the publisher with an environment for submitting video, image, or audio files into the system. In addition to raw media ingestion, the upload interface 710 also collects basic metadata such as titles, captions, and geotags, which serve as useful signals for downstream analysis.

Once content is submitted, the upload interface 710 communicates both with a category selector 720 and an AI assistant 730. The category selector 720 allows the creator to manually select predefined verticals or categories, such as "restaurant," "retail," "concert," or "fitness studio." By choosing a category, the system ensures that overlay recommendations are filtered and tailored to contextually appropriate domains. In parallel, the AI assistant 730 executes automated analysis of the uploaded media, examining video frames, audio transcripts, and textual captions to infer potential business entities, service providers, or venues represented within the content. For example, a restaurant logo detected in a frame or a business name mentioned in a caption may trigger the AI assistant 730 to identify a relevant ordering or reservation endpoint.

Based on these combined inputs, the system generates a set of recommended buttons 740, which represent actionable controls that could be rendered to viewers once the content is published. These buttons may include labels such as "ORDER," "RESERVE," "BUY TICKETS," or "DRIVE," depending on the identified context. Recommendations are not static; rather, they are dynamically conditioned on both the category selector 720 and AI-driven insights provided by the AI assistant 730. In embodiments where the AI inference conflicts with the manual selection, the system may propose blended recommendations while still allowing the publisher to override final choices.

In some embodiments, the system may present an indicator that the subject merchant, restaurant, or service is local or geographically proximate to the viewer. Such an indicator may take any of a variety of forms, including a blinking or pulsing label, a highlighted text notice, a color shift, a graphical icon, an auditory tone, a spoken prompt, or a haptic feedback event such as a vibration on a handheld device. The indicator may also be embedded in or adjacent to actionable controls within a smart banner, ensuring that "Local" or "Nearby" status is conveyed as part of the user's decision-making pathway at the time of engagement. This embodiment includes may include both static implementations (e.g., a persistent "Local" label) and implementations (e.g., animated, flashing, or otherwise attention-drawing treatments). By doing so, the system prevents circumvention where a platform might otherwise show the word "Local" without meaningful integration into overlay controls.

In further embodiments, creators or businesses may select from predefined category templates (e.g., restaurant, retail, travel, services, or real estate). Each template surfaces a preset set of contextual action controls associated with the chosen category, such as "ORDER," "RESERVE," "BUY TICKETS," or "CONTACT AGENT." The availability, design, and behavior of these controls may be constrained or governed by host-platform policies, such as those imposed by social media or e-commerce platforms, to ensure compliance with platform-wide user interface and commercial transaction rules. These templates may be dynamically refined by AI-driven recommendations, creator overrides, or locale-specific requirements.

In some embodiments, the engagement system stores not only the media object (e.g., a video, post, or feed element) but also the associated commercial action control (e.g., "ORDER," "RESERVE," "MENU," "DRIVE," "PUR-CHASE," or "REMIND ME LATER" button). When a viewer elects to save an opportunity for later, the system preserves the actionable commerce pathway itself, such that upon recall the same transactional button, link, or equivalent provider endpoint is re-presented in association with the content.

The selected controls are then compiled into overlay instruction signals 750, which define the schema for how and when overlays will be presented during media playback. The overlay instruction signals 750 are data structures containing metadata fields such as button types, trigger conditions, display positions, and linked provider endpoints. These signals are associated with the corresponding media object 755, thereby binding actionable overlays to the content at the time of upload rather than requiring post-distribution configuration. During playback, the media object 755 can immediately call upon its linked overlay instruction signals 750, ensuring that the viewer experience is enriched with consistent, contextually relevant engagement opportunities.

Collectively, the workflow depicted in FIG. 7 demonstrates how the upload interface 710, category selector 720, AI assistant 730, and recommended buttons 740 cooperate to generate overlay instruction signals 750 tied to a media object 755. This AI-assisted authoring process reduces the cognitive burden on creators, enforces platform-wide consistency in actionable overlays, and ensures that commercial or experiential endpoints are embedded at the point of content creation.

Figure 8:
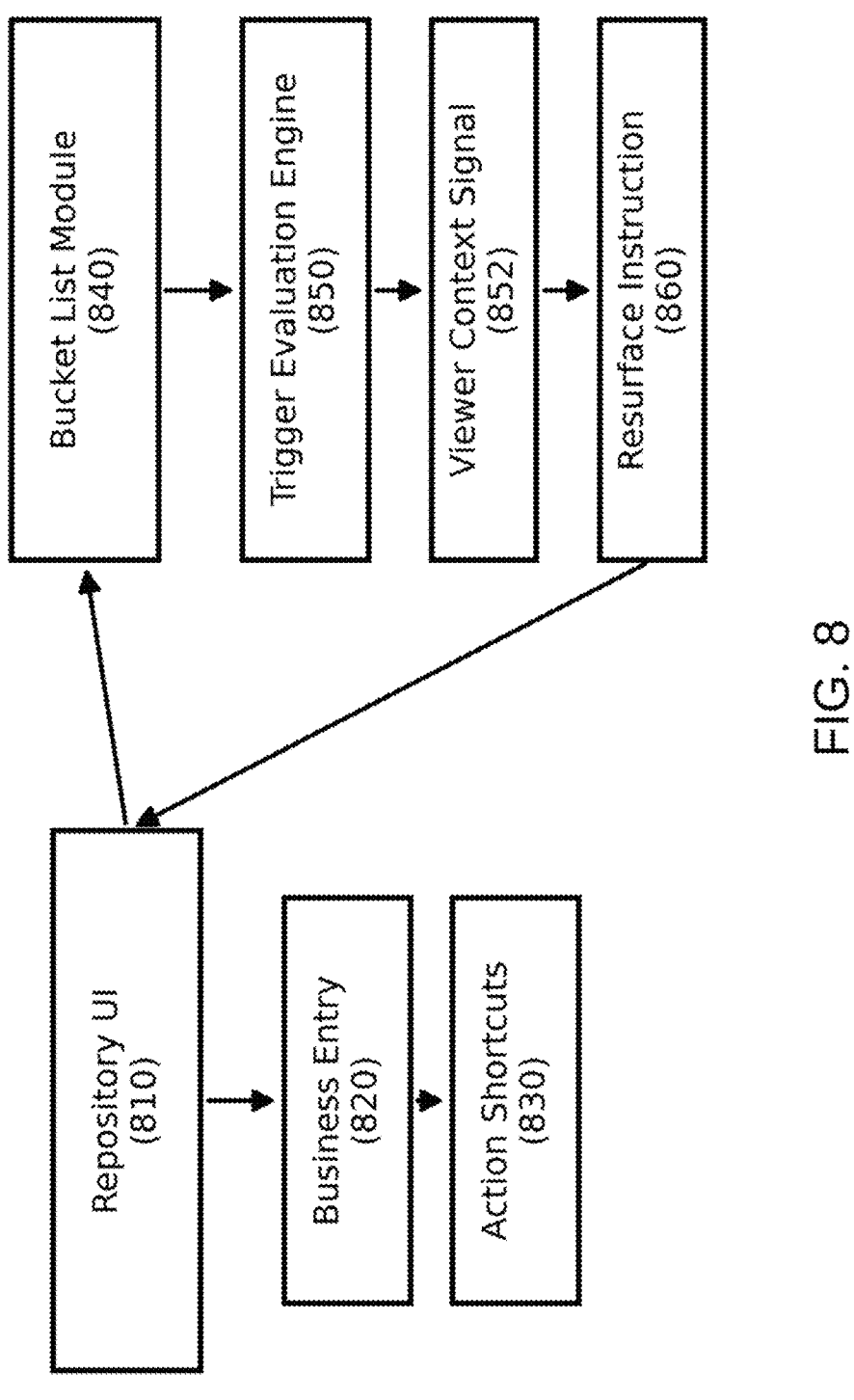
FIG. 8 representatively illustrates an embodiment of a persistent repository system, according to an embodiment.

FIG. 8 representatively illustrates an embodiment of a persistent repository system 800 that maintains viewer engagements across sessions, also referred to as a "Smart Closet" or "Favorites" list, according to an embodiment. This repository enables viewers to save or defer opportunities encountered during media playback for subsequent resurfacing and action.

The entry point is the repository UI 810, which provides the viewer with an accessible interface within their profile or account menu. The repository UI 810 displays a structured list of previously engaged entities, such as restaurants, retail stores, or event venues. Each entry may include the entity's name, a thumbnail image captured from the original media, and metadata such as the date of initial interaction or proximity to the viewer's current location. When a viewer selects an entity within the repository, a Business Entry 820 page is displayed, containing more detailed contextual information about that entity.

From the business entry 820 screen, the viewer is presented with a set of Action Shortcuts (830), which provide direct engagement options such as "ORDER AGAIN," "BOOK AGAIN," or "GET DIRECTIONS." These shortcuts streamline repeat transactions by bypassing intermediate navigation steps, thereby lowering friction for follow-up actions. The action shortcuts 830 may be dynamically tailored to the category of the entity for example, restaurants may present "Order Again" while event venues may surface "Buy Tickets."

On the backend, the bucket list module 840 manages the persistence of saved entities within the repository. Each time a viewer selects a "Save for Later" or equivalent action during media playback, the associated entity record is stored by the Bucket List Module (840) in a structured datastore. To ensure relevance, the trigger evaluation engine 850 periodically reviews these records against updated context signals, such as changes in viewer location, time of day, or detected behavioral preferences.

The trigger evaluation engine 850 makes use of a viewer context signal 852, which provides real-time attributes including geographic coordinates, device capabilities, and temporal state markers. By aligning repository entries against this context signal, the system can determine whether deferred opportunities should be resurfaced. For instance, a restaurant entry may be prioritized if the viewer is physically nearby during lunch hours.

When conditions are satisfied, the trigger evaluation engine 850 issues a resurface instruction 860, which directs the repository and user interface to bring a previously saved entity back into prominence. The resurface instruction 860 may trigger a push notification, an in-app banner, or the reordering of entries within the repository UI 810. This ensures that deferred opportunities are presented at moments when they are most actionable and contextually relevant.

Collectively, the flow depicted in FIG. 8 demonstrates how ephemeral engagement signals captured during content playback are converted into structured repository entries within the repository UI 810, stored by the bucket list module 840, evaluated by the trigger evaluation engine 850 using viewer context signal 852, and ultimately reactivated via resurface instruction 860. By maintaining this persistent repository of engagements, the system enhances user retention, facilitates repeat transactions, and enables targeted resurfacing of deferred opportunities in alignment with the viewer's context.

Figure 9:
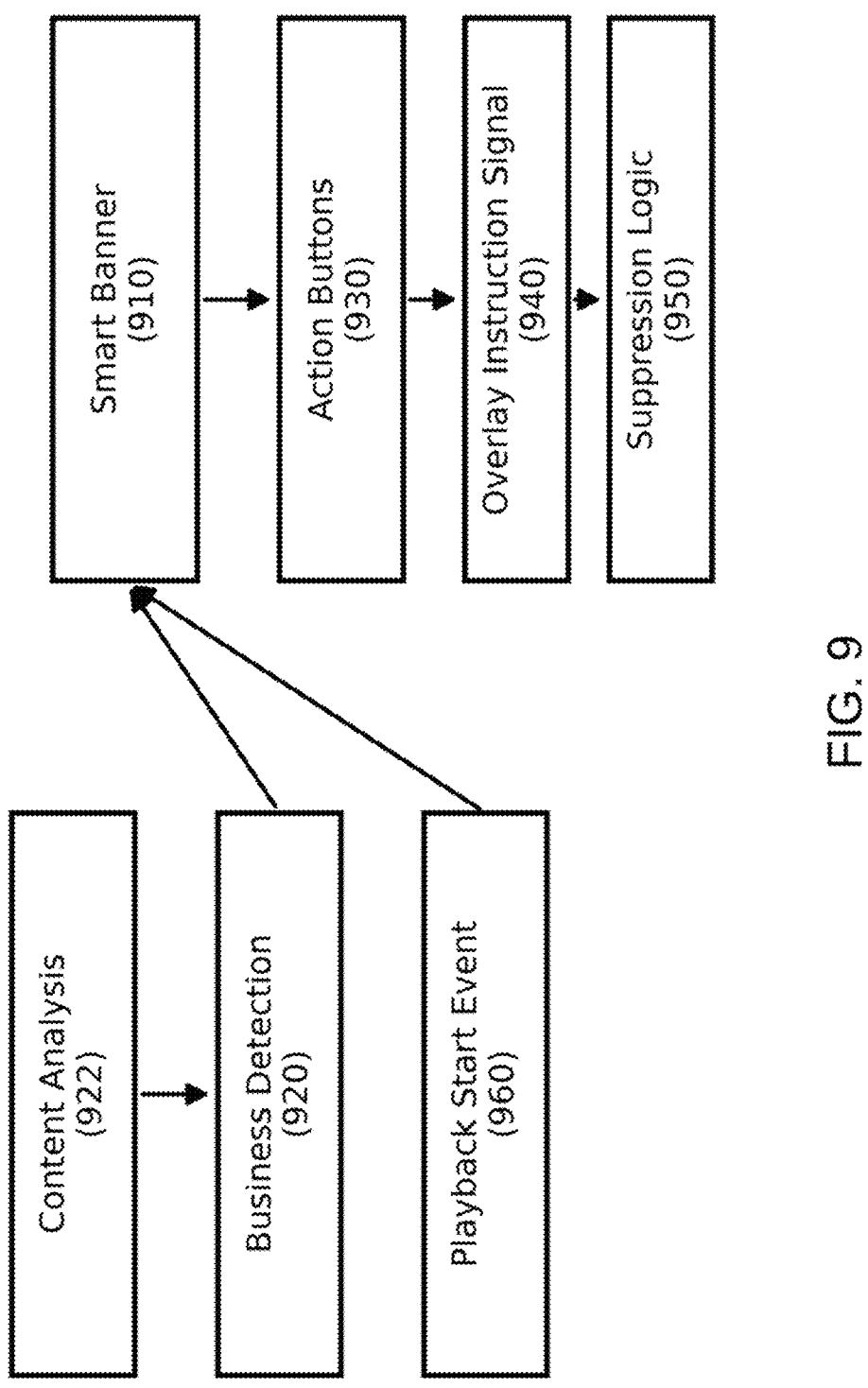
FIG. 9 representatively illustrates an embodiment of a proactive overlay system, according to an embodiment.

FIG. 9 representatively illustrates an embodiment of a proactive overlay system 900 in which a smart banner 910 is automatically generated and displayed without requiring explicit viewer interaction, according to an embodiment. This embodiment reduces friction by immediately surfacing actionable opportunities at the beginning of playback, ensuring maximum visibility and case of access for the viewer.

The process begins with content analysis 922, which inspects incoming media streams to extract semantic and contextual information. The content analysis 922 may employ computer vision models, speech recognition, or natural language processing to detect references to businesses, venues, or services embedded within the content. When a candidate business or service is detected, the system records this through a business detection 920 operation. The business detection 920 stage identifies the entity, assigns category tags, and aligns it with known provider endpoints when available.

Concurrently, a playback start event 960 is generated at the initiation of content playback. This event acts as a trigger signal to synchronize the timing of overlay rendering, ensuring that the Smart Banner 910 appears promptly as the media begins, rather than requiring a later manual interaction. Both the business detection 920 result and the playback start event 960 converge to initiate the rendering of the smart banner 910.

The smart banner 910 is a persistent graphical element anchored within the media playback interface. It typically occupies a consistent portion of the screen, such as the lower banner area, to minimize disruption while maximizing visibility. The banner contains one or more action buttons 930, which provide contextual affordances including "ORDER," "RESERVE," "BUY TICKETS," or "GET DIRECTIONS." The set of action buttons 930 may be drawn from a default library, adapted based on the content category, or personalized to the viewer's prior interaction history.

Once configured, the action buttons 930 are compiled into an overlay instruction signal 940. The overlay instruction signal 940 encodes the actionable elements, visual styling, placement metadata, and temporal instructions necessary for rendering. This ensures that the overlay presentation is consistent across devices and resilient to playback variations.

To prevent over-saturation, the system incorporates suppression logic 950 downstream of the instruction signal. The suppression logic 950 evaluates contextual and behavioral conditions, such as whether the viewer has recently dismissed a similar banner, whether excessive overlays are already present, or whether the viewer's current session context suggests a reduced likelihood of engagement. For example, the system may suppress food-ordering banners outside of mealtime hours or deprioritize retail overlays if a viewer recently ignored multiple shopping prompts. By doing so, the suppression logic maintains a balance between proactive engagement and user experience continuity.

Collectively, the workflow of FIG. 9 demonstrates how content analysis 922 and business detection 920, combined with a playback start event 960, generate a smart banner 910 that presents action buttons 930 via an overlay instruction signal 940. The inclusion of suppression logic 950 ensures context-aware control, thereby maximizing engagement opportunities while reducing user fatigue and maintaining personalization.

Figure 10:
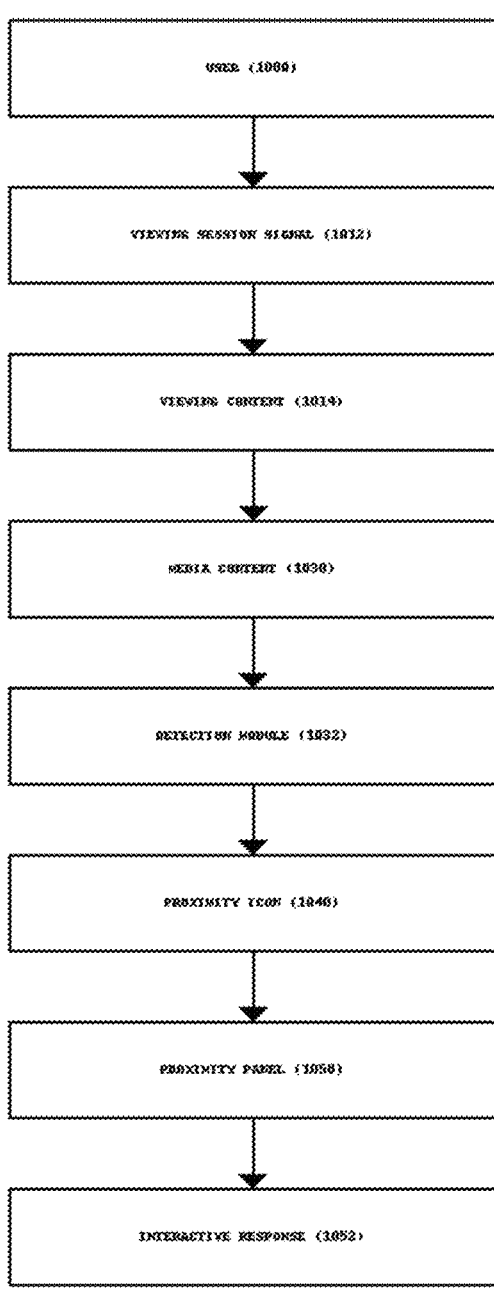
FIG. 10 representatively illustrates a flow diagram of a system within a digital media environment, according to an embodiment.

FIG. 10 representatively illustrates a flow diagram of a system for generating contextual overlays within a digital media environment, according to an embodiment. A user 1000 operates a client application that renders media content 1030 such as videos, still images, or live streams on a display. During playback, the client transmits a viewing-session signal 1012 to an artificial-intelligence (AI) analysis service. The AI service ingests viewing content 1014 that includes one or more of raw frame samples, audio segments, closed captions, and creator-supplied metadata. A detection module 1032 evaluates the content to infer an entity referenced in the media (e.g., a restaurant, venue, activity, or product) and to resolve a candidate geographic location for that entity.

Upon a confidence threshold being met, the system composes a contextual overlay. A proximity icon 1040 is instantiated as an overlay layer anchored to the current frame timecode. The client determines the user's current position (e.g., via GNSS, Wi-Fi, or IP geolocation) and computes distance and travel time to the resolved place using routing services. The computed metrics are rendered in a proximity panel 1050, sometimes referred to as a "smart banner."

Selection of either the icon 1040 or the panel 1050 generates an interactive response 1052. This response packages the selected action identifier, the normalized place record, and the session context, which the client or a server uses to map the signal to a provider endpoint and, if applicable, compose a transaction request with authentication tokens and idempotency keys.

Figure 11:
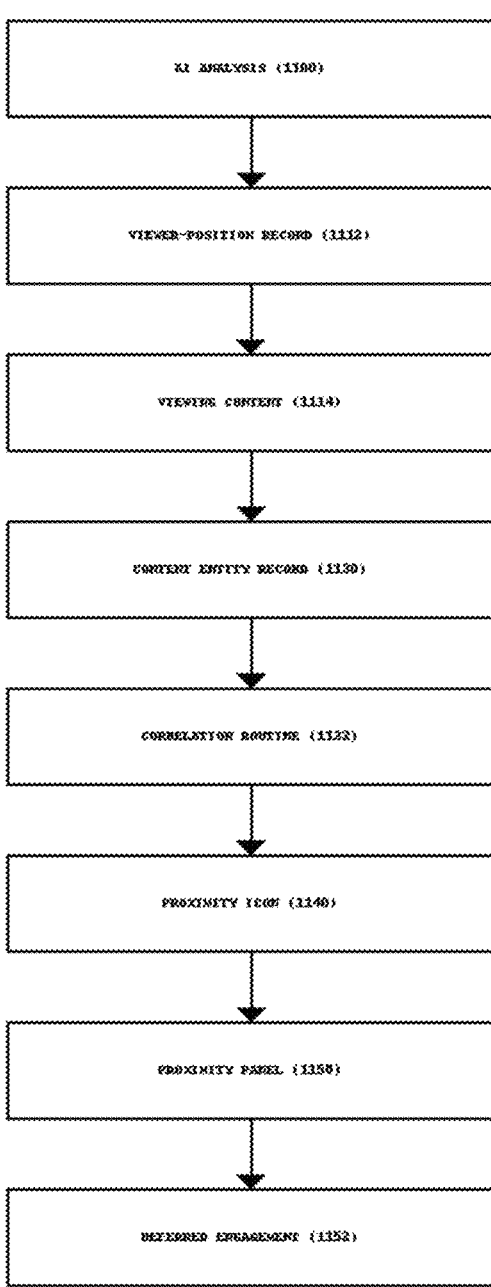
FIG. 11 representatively illustrates a schematic workflow showing how proximity is computed and how overlay presentation adapts to context, according to an embodiment.

FIG. 11 representatively illustrates a schematic workflow showing how proximity is computed and how overlay presentation adapts to context, according to an embodiment. In this embodiment, an AI analysis 1100 module ingests viewing content and produces a structured content-entity record.

In parallel, the system generates a viewer-position record 1112 using device sensors such as GNSS, Wi-Fi, or cellular triangulation, which may also be supplemented with IP-based geolocation and device telemetry. The viewer-position record 1112 is timestamped to ensure freshness and includes both raw location signals and normalized coordinates suitable for correlation.

The AI service further processes viewing content 1114, which may comprise sampled video frames, audio transcripts, closed captioning, or metadata extracted from the digital media. From this content, the service derives candidate entities of interest and supporting contextual attributes.

The results of the AI analysis 1100 and the viewing content 1114 are combined into a content-entity record 1130, which includes a canonical place identifier, category labels, associated coordinates, and confidence levels derived from multimodal evidence. This record provides the foundation for contextual overlay generation.

A correlation routine 1132 compares the viewer-position record 1112 with the content-entity record 1130 to compute relative proximity. This may involve geodesic distance calculations, live travel-time estimation through routing services, or behavioral alignment metrics based on device feasibility. The correlation routine 1132 outputs a structured correlation result used to determine overlay presentation.

When the correlation result indicates actionable proximity, the system instantiates a proximity icon 1140. The icon 1140 may be synchronized to media timecodes such that it appears precisely when the relevant entity is depicted on screen, ensuring temporal coherence with the underlying content.

Upon activation of the proximity icon 1140, the system renders a proximity panel 1150, which may display computed metrics such as distance and travel time (e.g., "2.5 miles/8 min drive"). The proximity panel 1150 may also include category tags or contextual hints (e.g., "restaurant," "golf," "concert") that enhance user comprehension and accessibility.

When the entity is determined to be outside of an actionable radius or temporal window, the system generates a deferred engagement record 1152. This record includes entity identifiers, location coordinates, and trigger conditions (such as time, geofence, or session context) that cause the overlay to resurface at a later, more relevant moment. Deferred engagement 1152 ensures continuity of experience and allows users to act on contextual content even when immediate engagement is not feasible.

Figure 12:
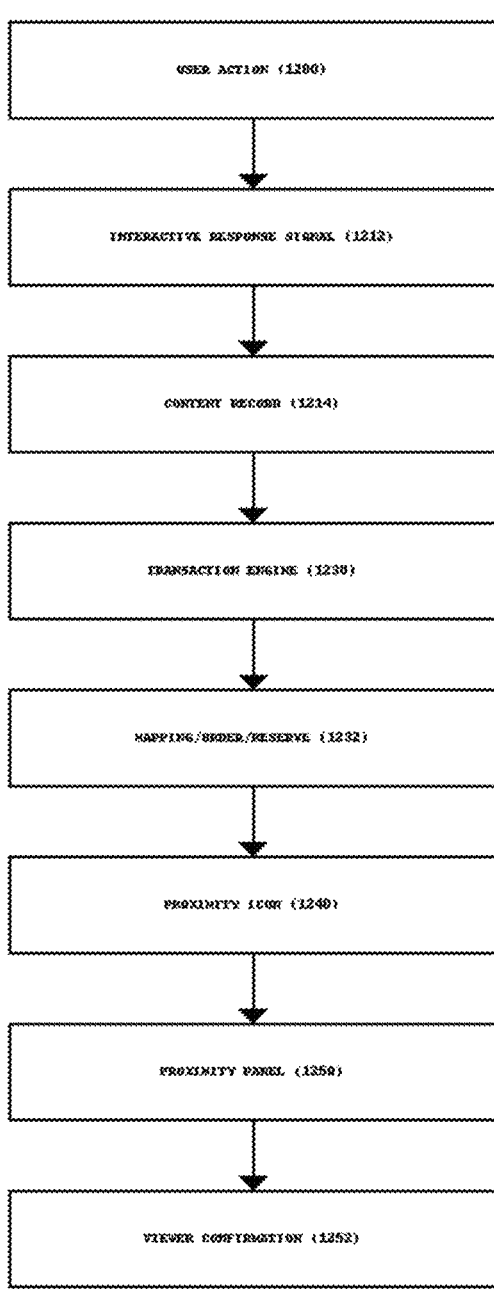
FIG. 12 representatively illustrates an end-to-end control loop, according to an embodiment.

FIG. 12 representatively illustrates an end-to-end control loop initiated by a user action 1200, such as selecting a proximity icon or panel, according to an embodiment. The action generates an interactive response signal 1212 that encodes the control identifier, place record, coordinates, and session context. This response is paired with a content record 1214 and processed by a transaction engine 1230. Depending on the interaction, the transaction engine branches into mapping/order/reserve 1232 functions. For navigation, it launches a mapping intent; for ordering or reservations, it composes a provider-specific transaction instruction, possibly choosing between providers.

The loop also updates the proximity icon 1240 and proximity panel 1250 for contextual presentation back to the user. Finally, when a transaction is confirmed or acknowledged, a viewer confirmation 1252 is generated, providing an in-context acknowledgement on the client device. This ensures idempotency, clear status updates, and robust error handling through retries if needed.

In an embodiment, the system originates the order object within the overlay platform itself rather than delegating order creation to an external provider. The transaction module, executing within the platform, compiles a structured order record that includes the relevant entity identifiers, user-selected items or services, contextual and temporal parameters, and various authentication tokens. This record is constructed and logged before any external request is transmitted. External providers such as delivery networks, reservation platforms, or ticketing services serve only as execution endpoints that fulfill the already-originated order object. By establishing origination within the overlay environment, the platform retains authoritative control over the initiation of commerce, attribution of monetization events, triggering of deferred engagement signals, and continuity of user session state. This embodiment may prevent circumvention scenarios in which a hosting service might otherwise claim to merely redirect a user through a static deep link.

Figure 13:
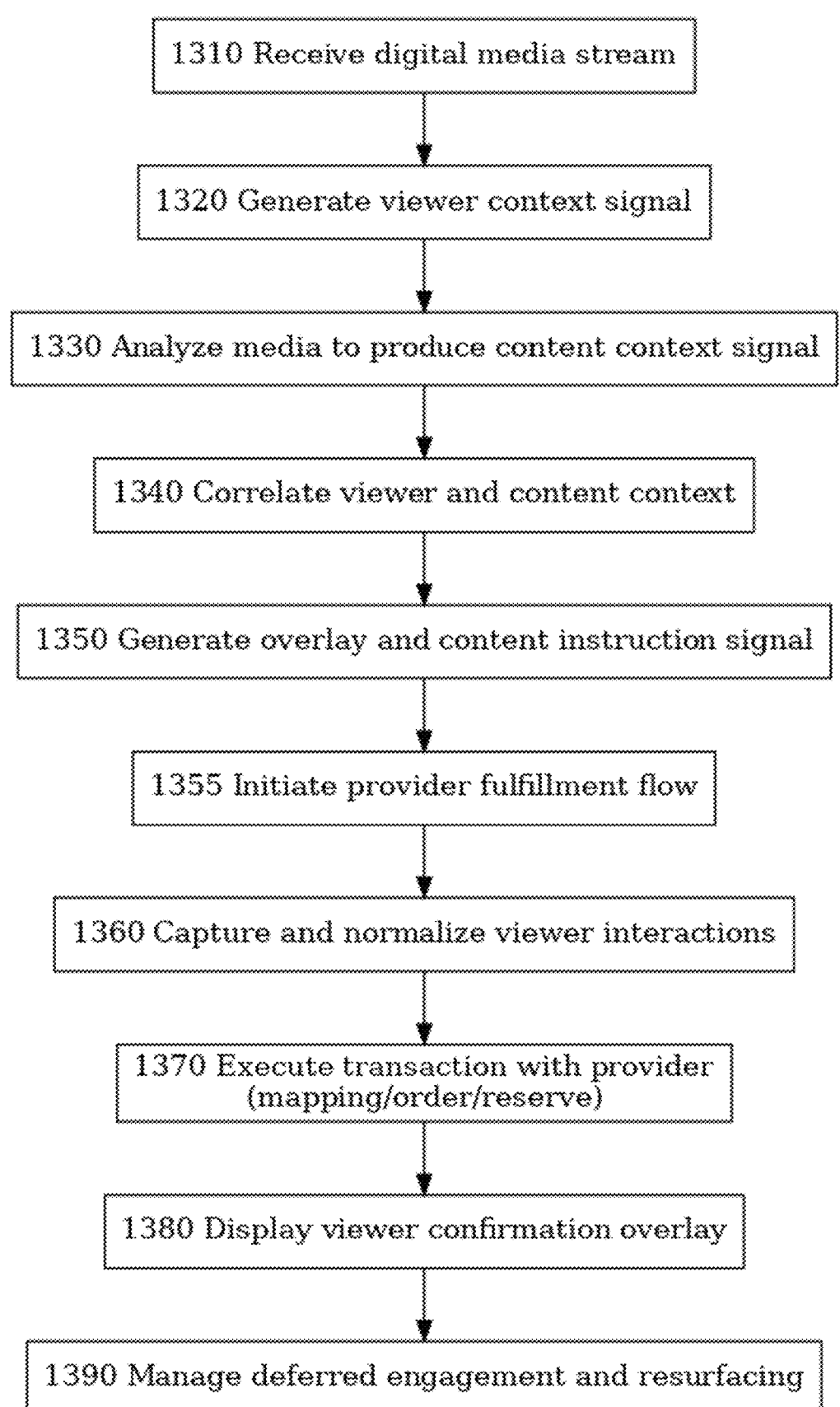
FIG. 13 representatively illustrates a method for generating and presenting actionable overlays within digital media content, according to an embodiment.

FIG. 13 representatively illustrates a method 1300 for generating and presenting actionable overlays within digital media content, according to an embodiment. Method 1300 may be executed by a client device, a remote server, or a hybrid deployment wherein certain steps are executed locally and others are offloaded. Method 1300 comprises a series of ordered computational steps that transform a raw digital media stream into actionable overlays, convert viewer interaction into structured transactions, and optionally resurface deferred engagements at a later time. Each step corresponds to an algorithmic operation performed by one or more software modules, and together they form a closed-loop system from content ingestion to user action and back to deferred opportunity management.

In step 1310, the client device receives a digital media stream. The stream may originate from a content delivery network, a video hosting service, a peer-to-peer distribution platform, or a locally stored media file. Media may be delivered as adaptive bitrate segments or as low-latency streams. Upon receipt, the device demultiplexes the audio and video tracks and synchronizes them for playback. Frames are provided for content analysis, while audio tracks are passed into automatic speech recognition pipelines. In some embodiments, a jitter buffer and adaptive streaming logic are employed to minimize latency and compensate for network variability, ensuring that overlay generation remains in sync with the media timeline.

In step 1320, a context determination process generates a viewer context signal. This may include acquiring geographic data from GNSS receivers, scanning Wi-Fi access points, querying cellular tower timing data, or retrieving demographic and behavioral features from user profiles (subject to consent). The signal may also include device descriptors such as display resolution, available input mechanisms, and network state. Behavioral features may be derived from interaction logs, weighted toward recent actions. In some embodiments, a sensor-fusion algorithm continuously refines the signal into a normalized, confidence-scored context vector.

In step 1330, the content analysis process analyzes the media stream to produce a content context signal. Video frames may be sampled and processed by computer vision pipelines for logo or storefront recognition; OCR may extract signage or product labels; and audio streams may be transcribed by speech recognition and subjected to named-entity recognition. Multimodal fusion aligns the results across pipelines, combining confidence values where modalities converge (e.g., both speech and OCR detect the same restaurant name). The content context signal encodes candidate entities, coordinates when available, categories, confidence scores, and evidence modalities.

In step 1340, a correlation process compares the viewer context signal with the content context signal to produce a correlation result. This may involve computing geodesic distance, estimating travel time with routing services, comparing demographic attributes in embedding space, or checking device and temporal suitability. The correlation result may include metrics such as {distance, travel time, demographic similarity, behavioral likelihood, device feasibility, temporal alignment, composite score, timestamp}.

In step 1350, a user interface generation process consumes the correlation result and produces an overlay instruction signal. This determines which overlays should appear (e.g., "Order Now," "Reserve," "Directions"). In some embodiments, reinforcement learning or ranking models predict which controls are most useful to the viewer. The overlay instruction includes layout metadata, style attributes, animation sequences, and accessibility descriptors. In immersive environments, the instruction may include 3D anchors so overlays appear positioned relative to objects.

In step 1355, the overlay initiates a fulfillment flow within the hosting application, maintaining session context. Only if platform policy requires does the system deep-link to an external application or browser, in which case the hand-off type is recorded.

In step 1360, when the viewer interacts with an overlay, input is captured (e.g., touch, click, voice command, gaze fixation) and normalized into a structured interaction signal. The signal includes the overlay identifier, action type, timestamp, and contextual parameters such as authentication tokens. This interaction is then mapped to a provider-specific action and translated into a transaction instruction with the necessary authorization artifacts.

In step 1370, the transaction is finalized. Monetization metadata, such as affiliate identifiers or referral codes, may be appended. The completed transaction request is transmitted to an external provider API (e.g., food delivery, ticketing, reservations), which responds with a transaction confirmation. The confirmation is rendered back to the viewer as an acknowledgment overlay, closing the interaction loop.

In step 1380, if the viewer defers engagement, the system creates a deferred engagement record. Triggers may include time-based windows (e.g., resurfacing lunch offers at noon), geofences, or context-based cues. When a trigger is met, the deferred opportunity resurfaces as a reminder overlay, allowing the user to act at a later time or place.

In some embodiments, deferred engagements may be scheduled for resurfacing at predetermined times (e.g., a late-night food order option resurfacing during lunch hours).

Method 1300 may be executed entirely on the client, entirely on the server, or in hybrid form. In client-only embodiments, all steps are performed locally with only transaction instructions sent to providers. In server-centric embodiments, raw features are sent upstream, with overlays and transactions managed remotely. Hybrid and offline embodiments support a mix of local execution, deferred transmission, and privacy-preserving configurations where sensitive identifiers remain encrypted on-device.

Figure 14:
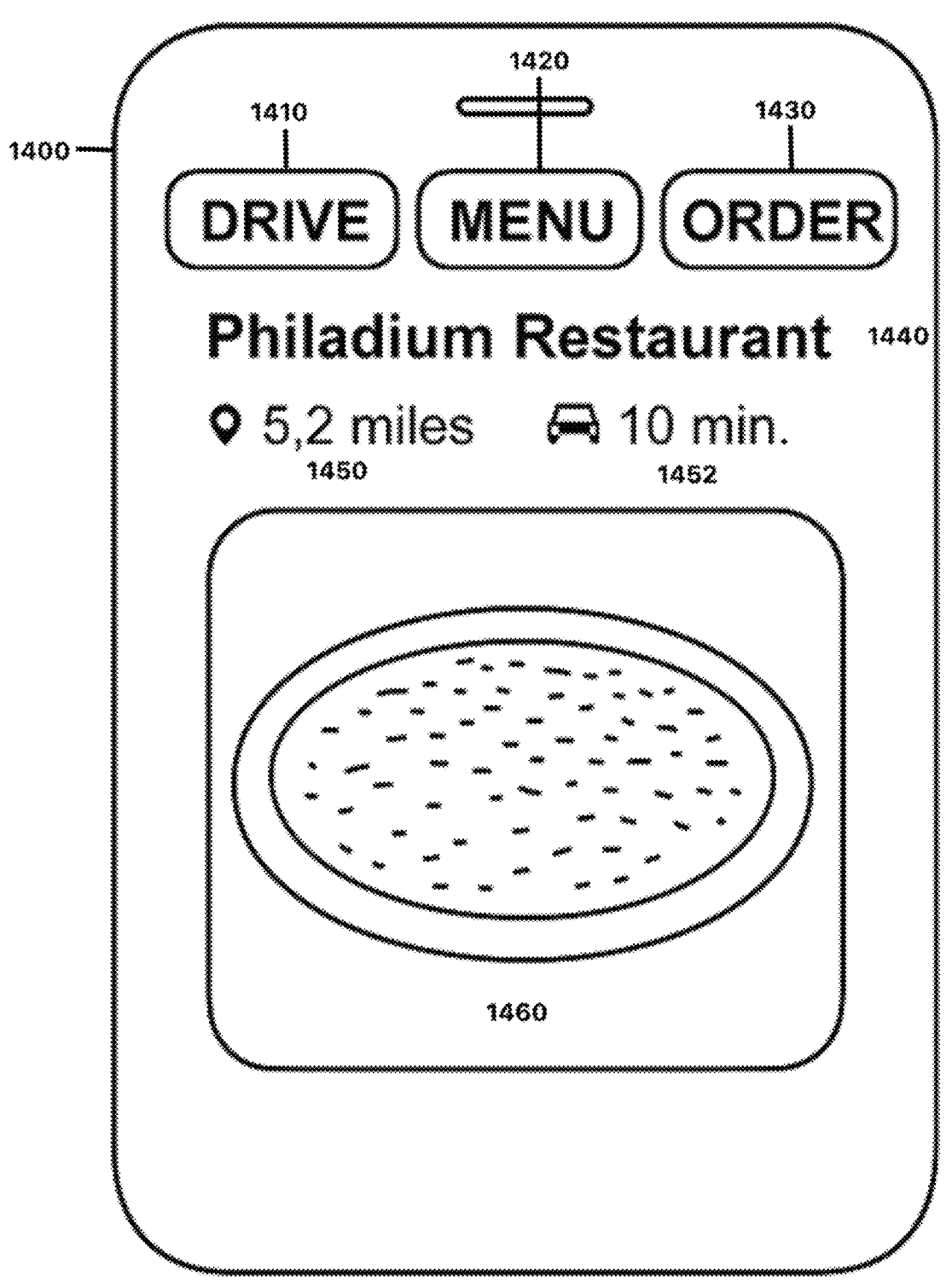
FIG. 14 illustrates a contextual overlay presented on a mobile device, according to an embodiment.

FIG. 14 illustrates a contextual overlay presented on a mobile device 1400 for a restaurant engagement scenario, according to an embodiment. The user interface includes three actionable controls: a drive button 1410, a menu button 1420, and an order button 1430. These controls are dynamically generated overlays that adapt to the content being consumed. The example depicts "Philadium Restaurant" 1440 as the detected entity, with proximity indicators showing a computed distance 1450 of 5.2 miles and an estimated travel time 1452 of 10 minutes, calculated using the correlation engine of the system. A media preview panel 1460 displays a visual depiction of a menu item, which enhances recognition and trust for the viewer. When activated, the buttons transmit structured interaction signals to the transaction engine, enabling real-time navigation, browsing of the digital menu, or direct ordering within the media session. This figure demonstrates how the system transforms passive media consumption into actionable commerce opportunities.

Figure 15:
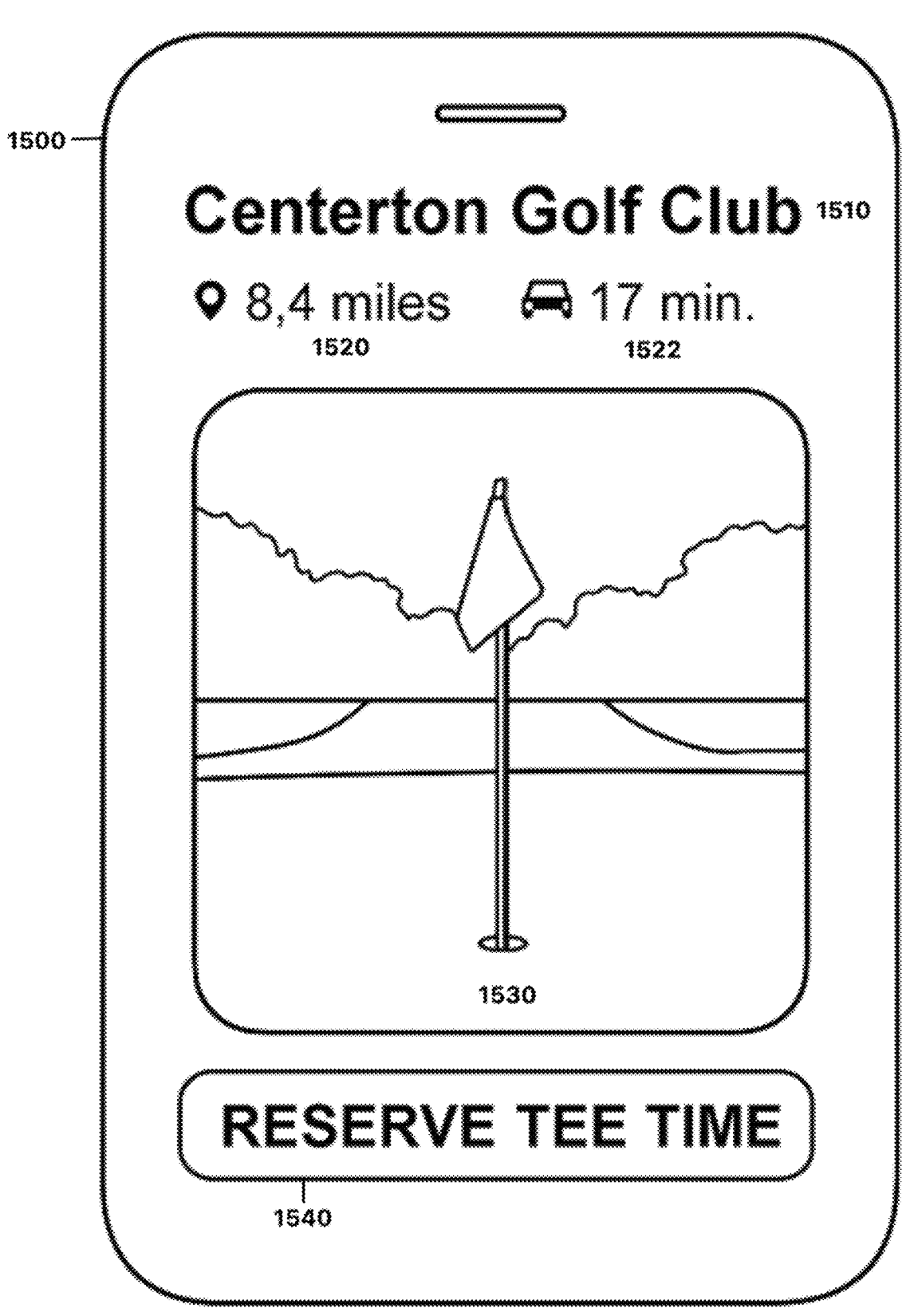
FIG. 15 illustrates a contextual overlay presented on a mobile device, according to an embodiment.

FIG. 15 illustrates a contextual overlay presented on a mobile device 1500 for a recreational engagement scenario, according to an embodiment. The detected entity in this example is "Centerton Golf Club" 1510. Proximity indicators display a computed distance 1520 of 8.4 miles and an estimated travel time 1522 of 17 minutes. A media preview panel 1530 shows a golf course image with a flagpole, reinforcing the recognized venue. An action button labeled "Reserve Tee Time" 1540 provides an immediate, contextually relevant transaction option. Upon user interaction, the button generates an interactive response signal that includes the canonical entity record and proximity metrics, which is mapped to a reservation provider endpoint. This figure highlights how the invention extends beyond food services into sports, leisure, and other service-based experiences, making contextual overlays a versatile mechanism for bridging digital content with real-world activities.

The systems and methods disclosed herein may be adapted for use in a variety of contexts and industries. By way of illustration, implementations can support commerce, service booking, event participation, or other transactions in fields such as restaurants and food delivery, retail and live shopping, travel and hospitality, professional services, real estate, auctions, or wagering. These examples are provided to demonstrate potential use cases. Other categories, applications, and functional variations will be apparent to those of ordinary skill in the art and are considered within the scope of the present disclosure.

A feature illustrated in one of the figures may be the same as or similar to a feature illustrated in another of the figures. Similarly, a feature described in connection with one of the figures may be the same as or similar to a feature described in connection with another of the figures. Unless expressly described otherwise, the same or similar features may be noted by the same or similar reference characters. Additionally, the description of a particular figure may refer to a feature not shown in the particular figure. The feature may be illustrated in and/or further described in connection with another figure.

Elements of processes (i.e., methods) described herein may be executed in one or more ways, such as by a human, a processing device, mechanisms operating automatically or under human control, and so forth. Additionally, although various elements of a process may be depicted in the figures in a particular order, the elements of the process may be performed in one or more different orders without departing from the substance and spirit of the disclosure herein.

The preceding description sets forth numerous details such as examples of specific systems, components, methods, and so forth, to provide a good understanding of several implementations. However, it will be apparent to one skilled in the art that at least some implementations may be practiced without these specific details. In other instances, well-known components or methods are not described in detail or are presented in simple block diagram format to avoid unnecessarily obscuring the present implementations. Thus, the specific details set forth above are merely exemplary. Particular implementations may vary from these exemplary details and still be within the scope of the present implementations.

Related elements in the examples and/or embodiments described herein may be identical, similar, or dissimilar in different examples. For brevity and clarity, related elements may not be redundantly explained. Instead, the use of same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions, and/or properties disclosed above both explicitly and inherently. Where the disclosure or subsequently filed claims recite "a" element, "a first" element, or any such equivalent term, the disclosure or claims are to be understood to incorporate one or more such elements, neither requiring nor excluding two or more such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief Description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B, and C; A, B, C, and D; and so forth. The bounds of an "and/or" list are defined by the complete set of combinations and permutations for the list.

Where multiples of a particular element are shown in a FIG. or figure, and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements, and/or properties may be claimed through amendment of those claims or presentation of new claims in the present application or in a related application. Such amended or new claims, whether they are directed to the same example or a different example and whether they are different, broader, narrower, or equal in scope to the original claims, are to be considered within the subject matter of the examples described herein.

The invention claimed is:

1. A method, comprising:

receiving, by a digital content platform executing on a client device, a digital media stream depicting a business, a service, or an event, wherein the digital media stream is decoded and rendered by a content rendering engine of the client device;

determining, by a context determination module executing instructions on the client device, a contextual attribute of a viewer, wherein the contextual attribute comprises at least one of a geographic location determined from a positioning signal, a demographic attribute retrieved from a user profile, a behavioral attribute inferred from a historical engagement log, a device attribute obtained from a system call, or a temporal attribute derived from a system clock;

extracting, by a content analysis module executing instructions on the client device or a remote server, a contextual attribute associated with the business, the service, or the event by analyzing at least one of metadata embedded in the digital media stream, a hashtag parsed from an associated caption, an object detected using a computer vision model, audio transcribed by a speech-to-text engine, or a contextual feature inferred by an artificial intelligence model;

correlating, by a correlation engine, the contextual attribute of the viewer with the contextual attribute of the business, the service, or the event, wherein the correlation engine applies one of a distance calculation algorithm, a similarity scoring algorithm, or a temporal alignment algorithm to produce a correlation score;

generating, by a user interface generator, an actionable control rendered within or adjacent to the digital media stream, wherein the actionable control is drawn to a rendering layer of the display interface using a markup template and style definition; and executing, responsive to activation of the actionable control by a viewer input detected through a touch sensor, pointer device, or gesture recognition system, a transaction with a third-party provider by invoking an application programming interface call or launching a sandboxed micro-application.

2. The method of claim 1, wherein the actionable control is presented in a format selected from a banner, a pop-up icon, a sticker, a swipe-up element, a floating panel, a side panel, or an embedded widget, wherein the format is determined by a layout engine configured to evaluate a device type identifier retrieved from the system call, a screen resolution parameter provided by a rendering subsystem, a platform constraint defined in an operating system application programming interface, or a stored viewer preference record.

3. The method of claim 1, wherein the contextual attribute of the viewer comprises a geographic location determined by a location determination module configured to:

receive a raw location input comprising at least one of:

a satellite-based global positioning system (GPS) signal comprising a pseudorange measurement;

an Internet Protocol (IP) address resolved to a geographic region using a network geolocation service;

a Wi-Fi triangulation measurement based on a media access control (MAC) address and a received signal strength indicator (RSSI) from an access point; or a cell tower triangulation measurement derived from cell identity (Cell ID), timing advance, or signal strength of a plurality of cellular base station;

execute a sensor fusion algorithm, comprising at least one of an extended Kalman filter, particle filter, or weighted least-squares estimator, to reconcile the raw input into a unified geographic estimate; and output a normalized coordinate pair comprising a latitude value and a longitude value to generate the viewer context signal.

4. The method of claim 1, further comprising categorizing a correlation into a contextual label comprising one of a local proximity category, a regional proximity category, a long-distance travel category, a temporal engagement category, or a demographic affinity category, wherein the categorization is performed by:

applying a thresholding algorithm to the correlation score; and generating the actionable control configured to correspond to the contextual label, wherein the actionable control comprises one of a purchase control, a reservation control, or a deferred engagement control.

5. The method of claim 1, further comprising:

storing metadata associated with the business, service, or event in response to a deferred engagement input captured by an interaction listener, wherein the metadata is stored in a persistent storage medium and comprises at least one of a business identifier, a contextual attribute, or a timestamp; and resurfacing a notification comprising the actionable control by triggering a scheduling engine configured to evaluate one of a preset interval, a schedule associated with the business, or a predicted engagement time determined by a predictive model trained on historical interaction data.

6. The method of claim 1, further comprising modifying the actionable control in real time by an update engine, wherein the modification is performed in response to transportation data retrieved via an application programming interface, a business operating hour retrieved from a directory service, a reservation availability queried from a booking system, a product inventory obtained from a point-of-sale interface, or a trending activity determined from an engagement analytic, wherein the modification comprises dynamically altering a displayed label, a visual state, or a navigation target of the actionable control.

7. The method of claim 1, further comprising displaying the actionable control during a live broadcast stream, wherein the actionable control is triggered by one of a parsing time-coded metadata within a manifest file, detecting an audio feature using a speech recognition model, detecting a visual feature using a computer vision classifier, or extracting text using an optical character recognition engine, wherein the actionable control is injected into the rendering layer at a frame index aligned with the detected broadcast stream.

8. A system, comprising:

a client device comprising a processor and a memory storing instructions that, when executed by the processor, cause the client device to:

determine a contextual attribute of a viewer by invoking a context determination module, wherein the contextual attribute comprises at least one of a geographic location obtained from a positioning service, a demographic attribute retrieved from a user profile, a behavioral attribute inferred from a logged interaction, a device attribute obtained from a system call, or a temporal attribute determined from a system clock;

analyze digital content using a content analysis module to extract a contextual attribute of a business, a service, or an event by applying one of metadata parsing, image recognition, audio transcription, or artificial intelligence inference;

correlate the contextual attribute of the viewer with the contextual attribute of the business, the service, or the event by executing a correlation engine that computes a correlation score;

generate an actionable control within or adjacent to a display region of the digital content using a user interface generator; and initiate, upon detection of a viewer input activating the actionable control, a transaction with a third-party provider by invoking a communication channel; and a remote server comprising a processor and a memory storing instructions that, when executed by the processor, cause the remote server to receive the contextual information from the client device, generate a transaction instruction, and transmit the transaction instruction to the third-party provider using a transaction execution engine.

9. The system of claim 8, wherein the client device further comprises a user interface generator configured to select a format of the actionable control from a banner, a pop-up, a sticker, a swipe-up, a floating panel, a side panel, or an embedded widget, wherein the format is determined based on a rendering context parameter received from a graphics subsystem, an accessibility parameter defined by an operating system setting, or a platform-specific guideline, and rendered using a style sheet instruction.

10. The system of claim 8, wherein the remote server further comprises a correlation engine configured to categorize the correlation into a contextual label, wherein:

the categorization is performed by applying one of a geospatial threshold algorithm, a demographic similarity function, or a behavioral clustering function; and the contextual label determines whether the actionable control is instantiated as an order control, a reservation control, or a deferred engagement control.

11. The system of claim 8, wherein the remote server further comprises a monetization module configured to:

embed into the actionable control a monetization artifact selected from the group consisting of an affiliate link, a referral link, a cost-per-action link, or a revenue-sharing link; and select a preferred link from a plurality of candidate links by applying a prioritization algorithm that weighs:

a commission rate associated with the candidate link;

a latency of provider response; and an engagement history metric reflecting a prior viewer interaction or conversion.

12. The system of claim 8, wherein the client device further comprises a deferred engagement module configured to:

store a contextual attribute of the business, the service, or the event in a local or cloud database; and re-activate the actionable control when a subsequent contextual attribute of the viewer satisfies a re-activation condition, wherein the re-activation condition comprises one of a geofence trigger, a temporal trigger, or a behavioral trigger.

13. The system of claim 8, wherein the client device further comprises a personalization engine configured to adjust at least one of a size, a color scheme, a placement, a timing of display, or an animation of the actionable control, wherein:

the adjustment is determined by a machine learning model trained on historical viewer interaction data; and the model is periodically updated based on a reinforcement learning feedback from an engagement metric.

14. The system of claim 8, wherein the remote server further comprises a context analysis module configured to:

obtain real-time external data comprising at least one of transportation data, inventory data, or trending social activity; and update the actionable control by modifying a displayed content, a travel estimate, or a recommendation ranking.

15. An apparatus, comprising:

a processor; and a memory storing instructions that, when executed by the processor, cause the apparatus to:

determine a contextual attribute of a viewer, wherein the contextual attribute comprises at least one of a geographic location derived from a positioning signal, a demographic attribute retrieved from a stored profile, a behavioral attribute determined from a logged user interaction, a device attribute obtained via a system call, or a temporal attribute determined from a system clock;

analyze digital content to identify a contextual attribute of a business, a service, or an event using metadata parsing, object recognition, audio transcription, or machine learning inference;

correlate the contextual attribute of the viewer with the contextual attribute of the business, the service, or the event by applying a correlation function to generate a correlation score;

generate an actionable control comprising at least one of an order control, a reservation control, a deferred engagement control, or a directions control, wherein the actionable control is rendered to a user interface layer; and initiate, responsive to activation of the actionable control, a transaction with a third-party provider by transmitting transaction data over a secure communication channel.

16. The apparatus of claim 15, wherein:

the memory further stores instructions that cause the apparatus to suppress generation of the actionable control when the correlation score falls below a relevance threshold; and the relevance threshold being defined as a geospatial distance limit, a demographic dissimilarity score, or a temporal misalignment score.

17. The apparatus of claim 15, wherein the memory further stores instructions that cause the apparatus to transmit a contextual parameter comprising at least one of a geographic coordinate, a demographic identifier, a behavioral vector, or a transaction type to a third-party provider using a communication protocol comprising a digital signature.

18. The apparatus of claim 15, wherein the memory further stores instructions that cause the apparatus to select a link to a service provider by applying a weighting algorithm configured to:

assign numerical weights to a plurality of provider attributes including at least a commission parameter, a promotional factor, a latency or responsiveness measure, and a platform-priority value;

compute a composite score for each candidate provider link as a function of the assigned weights and the corresponding attribute values; and select the provider link associated with the highest composite score for embedding into an actionable overlay.

19. The apparatus of claim 15, wherein the memory further stores instructions that cause the apparatus to generate an actionable control configured to present wagering, betting, or predictive engagement options during a live event, wherein the actionable control is dynamically updated based on a score feed, a betting odds feed, or a prediction from a statistical model.

20. The apparatus of claim 15, wherein:

the memory further stores instructions that cause the apparatus to generate an engagement overlay comprising a polling control, a predictive outcome control, or a survey control;

the overlay is synchronized with media content using time-coded metadata; and transmit a response from the overlay to a back-end analytics server.

* * * * *